(12) United States Patent
Chheda et al.

(10) Patent No.: US 9,388,344 B2
(45) Date of Patent: Jul. 12, 2016

(54) BIOFUELS VIA HYDROGENOLYSIS AND DEHYDROGENATION-CONDENSATION

(75) Inventors: Juben Nemchand Chheda, Houston, TX (US); Lorna Beatriz Ortiz-Soto, Katy, TX (US); Joseph Broun Powell, Houston, TX (US)

(73) Assignee: Shell Oil Company, Houston, TX (US)

( * ) Notice: Subject to any disclaimer, the term of this patent is extended or adjusted under 35 U.S.C. 154(b) by 1024 days.

(21) Appl. No.: 13/106,509

(22) Filed: May 12, 2011

(65) Prior Publication Data

US 2011/0282115 A1 Nov. 17, 2011

Related U.S. Application Data

(60) Provisional application No. 61/333,916, filed on May 12, 2010.

(51) Int. Cl.
*C10L 1/04* (2006.01)
*C10G 3/00* (2006.01)
(Continued)

(52) U.S. Cl.
CPC .. *C10G 3/42* (2013.01); *C10G 3/50* (2013.01); *C10L 1/02* (2013.01); *C10L 1/023* (2013.01); *C10L 1/026* (2013.01); *C10L 1/04* (2013.01); *C10L 1/06* (2013.01); *C10L 1/08* (2013.01); *C10G 2300/1014* (2013.01); *C10G 2300/4081* (2013.01); *C10G 2400/02* (2013.01); *C10G 2400/04* (2013.01); *C10G 2400/08* (2013.01);
(Continued)

(58) Field of Classification Search
CPC .............. C07C 29/58; C07C 29/00; C07C 29/60; C07C 45/41; C07C 45/65; C07C 45/66; C07C 51/00; C07C 51/347; C07C 51/36; C07C 51/377; C07C 1/00; C07C 1/20; C07C 1/207; C07C 1/2072
USPC .......... 585/240, 242, 310, 312; 568/863, 862, 568/852, 861
See application file for complete search history.

(56) References Cited

U.S. PATENT DOCUMENTS 3,965,199 A * 6/1976 Wright ........................... 568/863
3,982,722 A 9/1976 Bernard
(Continued)

FOREIGN PATENT DOCUMENTS

WO WO03045841 6/2003 ............... C01B 3/02
WO WO2006119357 11/2006 .............. C07C 7/148
(Continued)

OTHER PUBLICATIONS

Blommel, P. G. et al., "Production of Conventional Liquid Fuels from Sugars," Aug. 25, 2008, pp. 1-14, http://www.Virent.com/BioForming/Virent_Technology_Whitepaper.pdf).*
(Continued)

*Primary Examiner* — In Suk Bullock
*Assistant Examiner* — Philip Louie

(57) ABSTRACT

A method comprising providing a carbohydrate feed; contacting at least a portion of the carbohydrate feed directly with hydrogen in the presence of a hydrogenolysis catalyst to produce a first reaction product comprising a stable hydroxyl intermediate; contacting at least a portion of the first reaction product comprising the stably hydroxyl intermediates with a dehydrogenation catalyst to form a second reaction product; and contacting at least a portion of the second reaction product with a condensation catalyst comprising a base functionality to form a fuel blend.

27 Claims, 3 Drawing Sheets

(51) Int. Cl.
*C10L 1/02* (2006.01)
*C10L 1/06* (2006.01)
*C10L 1/08* (2006.01)

(52) U.S. Cl.
CPC ........ *Y02E 50/13* (2013.01); *Y02P 30/42* (2015.11); *Y02T 50/678* (2013.01)

(56) References Cited

U.S. PATENT DOCUMENTS

| | | |
|---|---|---|
| 4,013,734 A | 3/1977 | Kim |
| 4,223,001 A | 9/1980 | Novotny et al. |
| 4,380,679 A | 4/1983 | Arena |
| 4,380,680 A | 4/1983 | Arena |
| 4,382,150 A | 5/1983 | Arena |
| 4,401,823 A | 8/1983 | Arena |
| 4,456,779 A | 6/1984 | Owen et al. |
| 4,476,331 A * | 10/1984 | Dubeck et al. .............. 568/861 |
| 4,487,980 A | 12/1984 | Arena |
| 4,503,274 A | 3/1985 | Arena |
| 4,541,836 A | 9/1985 | Derderian |
| 4,543,435 A | 9/1985 | Gould et al. |
| 4,554,260 A | 11/1985 | Pieters et al. |
| 4,670,613 A | 6/1987 | Ruyter et al. |
| 4,717,465 A | 1/1988 | Chen et al. |
| 4,828,812 A | 5/1989 | McCullen et al. |
| 4,885,421 A | 12/1989 | Harandi et al. |
| 4,919,896 A | 4/1990 | Harandi et al. |
| 4,935,568 A | 6/1990 | Harandi et al. |
| 5,001,292 A | 3/1991 | Harandi et al. |
| 5,019,135 A | 5/1991 | Sealock, Jr. et al. |
| 5,095,159 A | 3/1992 | Harandi et al. |
| 5,105,044 A | 4/1992 | Han et al. |
| 5,130,101 A | 7/1992 | Harandi et al. |
| 5,139,002 A | 8/1992 | Lynch et al. |
| 5,177,279 A | 1/1993 | Harandi |
| 5,180,868 A | 1/1993 | Baker et al. |
| 5,238,898 A | 8/1993 | Han et al. |
| 5,344,849 A | 9/1994 | Ayasse |
| 5,578,647 A | 11/1996 | Li et al. |
| 5,616,154 A | 4/1997 | Elliott et al. |
| 5,651,953 A | 7/1997 | Yokoyama et al. |
| 5,660,602 A | 8/1997 | Collier, Jr. et al. |
| 5,666,923 A | 9/1997 | Collier, Jr. et al. |
| 5,701,025 A | 12/1997 | Yoshimori |
| 5,787,863 A | 8/1998 | Henig et al. |
| 5,837,506 A | 11/1998 | Lynd et al. |
| 5,861,137 A | 1/1999 | Edlund |
| 5,879,463 A | 3/1999 | Proenca |
| 5,959,167 A | 9/1999 | Shabtai et al. |
| 6,022,419 A | 2/2000 | Torget et al. |
| 6,043,392 A | 3/2000 | Holtzapple et al. |
| 6,054,041 A | 4/2000 | Ellis et al. |
| 6,059,995 A | 5/2000 | Topsoe et al. |
| 6,090,595 A | 7/2000 | Foody et al. |
| 6,152,975 A | 11/2000 | Elliott et al. |
| 6,171,992 B1 | 1/2001 | Autenrieth et al. |
| 6,172,272 B1 | 1/2001 | Shabtai et al. |
| 6,207,132 B1 | 3/2001 | Lin et al. |
| 6,235,797 B1 | 5/2001 | Elliot et al. |
| 6,280,701 B1 | 8/2001 | Autenrieth et al. |
| 6,291,725 B1 | 9/2001 | Chopade et al. |
| 6,323,383 B1 | 11/2001 | Tsuchida et al. |
| 6,361,757 B1 | 3/2002 | Shikada et al. |
| 6,372,680 B1 | 4/2002 | Wu et al. |
| 6,387,554 B1 | 5/2002 | Verykios |
| 6,397,790 B1 | 6/2002 | Collier, Jr. |
| 6,413,449 B1 | 7/2002 | Wieland et al. |
| 6,440,895 B1 | 8/2002 | Tonkovich et al. |
| 6,479,428 B1 | 11/2002 | Tonkovich et al. |
| 6,479,713 B1 | 11/2002 | Werpy et al. |
| 6,486,366 B1 | 11/2002 | Ostgard et al. |
| 6,508,209 B1 | 1/2003 | Collier, Jr. |
| 6,570,043 B2 | 5/2003 | Elliott et al. |
| 6,607,707 B2 | 8/2003 | Reichman et al. |
| 6,670,300 B2 | 12/2003 | Werpy et al. |
| 6,677,385 B2 | 1/2004 | Werpy et al. |
| 6,699,457 B2 | 3/2004 | Cortright et al. |
| 6,739,125 B1 | 5/2004 | Mulligan |
| 6,749,828 B1 | 6/2004 | Fukunaga |
| 6,762,149 B2 | 7/2004 | Tonkovich et al. |
| 6,765,101 B1 | 7/2004 | Bhasin et al. |
| 6,841,085 B2 | 1/2005 | Werpy et al. |
| 6,953,873 B2 | 10/2005 | Cortright et al. |
| 6,964,757 B2 | 11/2005 | Cortright et al. |
| 6,964,758 B2 | 11/2005 | Cortright et al. |
| 6,969,506 B2 | 11/2005 | Tonkovich et al. |
| 7,022,824 B2 | 4/2006 | Vanoppen et al. |
| 7,038,094 B2 | 5/2006 | Werpy et al. |
| 7,186,668 B2 | 3/2007 | Werpy et al. |
| 7,199,250 B2 | 4/2007 | Werpy et al. |
| 7,273,957 B2 | 9/2007 | Bakshi et al. |
| 7,288,685 B2 | 10/2007 | Marker |
| 7,931,784 B2 | 4/2011 | Medoff |
| 2002/0020107 A1 | 2/2002 | Bailey et al. |
| 2002/0197686 A1 * | 12/2002 | Lightner ..................... 435/99 |
| 2003/0099593 A1 | 5/2003 | Cortright et al. |
| 2003/0100807 A1 | 5/2003 | Shabtai et al. |
| 2003/0115792 A1 | 6/2003 | Shabtai et al. |
| 2003/0167679 A1 | 9/2003 | Jordan |
| 2005/0065337 A1 * | 3/2005 | Werpy et al. ................ 536/128 |
| 2005/0203195 A1 | 9/2005 | Wang et al. |
| 2005/0207971 A1 | 9/2005 | Cortright et al. |
| 2005/0244329 A1 | 11/2005 | Casanave et al. |
| 2005/0271579 A1 | 12/2005 | Rogers |
| 2006/0013759 A1 | 1/2006 | Jiang et al. |
| 2007/0142633 A1 | 6/2007 | Yao et al. |
| 2007/0173643 A1 | 7/2007 | Werpy et al. |
| 2007/0173651 A1 | 7/2007 | Holladay et al. |
| 2007/0173652 A1 | 7/2007 | Holladay et al. |
| 2007/0173654 A1 | 7/2007 | Holladay et al. ............ 549/463 |
| 2008/0103344 A1 * | 5/2008 | Jones et al. ................. 585/242 |
| 2008/0216391 A1 | 9/2008 | Cortright et al. |
| 2008/0300434 A1 | 12/2008 | Cortright et al. |
| 2008/0300435 A1 * | 12/2008 | Cortright et al. ............ 585/14 |
| 2008/0302001 A1 | 12/2008 | Koivusalmi et al. |
| 2009/0113787 A1 | 5/2009 | Elliott et al. |
| 2009/0124839 A1 | 5/2009 | Dumesic et al. |
| 2009/0255171 A1 | 10/2009 | Dumesic et al. |
| 2010/0076233 A1 | 3/2010 | Cortright et al. |
| 2010/0218417 A1 | 9/2010 | Bauldreay et al. |
| 2011/0154721 A1 | 6/2011 | Chheda et al. |
| 2011/0154722 A1 | 6/2011 | Chheda et al. |
| 2013/0199085 A1 | 8/2013 | Chheda et al. |
| 2014/0173975 A1 | 6/2014 | Chheda et al. |

FOREIGN PATENT DOCUMENTS

| | | | |
|---|---|---|---|
| WO | WO 2007075370 | 7/2007 | |
| WO | WO2007075476 | 7/2007 | |
| WO | WO 2007103858 | 9/2007 | ............. C07C 1/247 |
| WO | WO2008109877 | 9/2008 | ............... C10G 3/00 |

OTHER PUBLICATIONS

Sinnott, R.K., Coulson and Richardson's Chemical Engineering vol. 6—Chemical Engineering Design, 4th Edition, Elsevier, 2005, p. 50.*

Edward L. Kunkes et al., "Catalytic Conversion of Biomass to Monofunctional Hydrocarbons and Targeted Liquid-Fuel Classes," SCIENCE, vol. 322, Oct. 17, 2008, pp. 417-421, XP000002657218.

Vanessa Lehr, et al., "Catalytic Dehydration of Biomass-Derived Polyols in Sub- and Supercritical Water," Catalysis Today, vol. 121, Jan. 10, 2007, pp. 121-129, XP000002657219.

Kottapalli K. Rao, et al., "Activation of Mg/Al Hydrotalcite Catalysts for Aldol Condensation Reactions," Journal of Catalysis, vol. 173, CA971878, Dec. 31, 1997, pp. 115-121, XP000002657220.

Juben N. Chheda, et al., "An Overview of Dehydration, Aldol-Condensation and Hydrogenation Processes for Production of Liquid Alkanes from Biomass-Derived Carbohydrates," Catalysis Today, vol. 123, Jan. 7, 2007, pp. 59-70, XP000002657221.

Anderson Ferreira da Cunha, et al., "Industrail Potential of Yeast Biotechnology in the Production of Bioethanol in Brazil: the

(56) References Cited

OTHER PUBLICATIONS

Example of Conditional Flocculation," Chapter 4 in "Industrial Perspectives for Bioethanol," Dec. 31, 2006, pp. 59-75, XP000002657381.

Antonio Rodriguez-Chong. et al., "Hydrolysis of Sugar Cande Bagasse Using Nitric Acid: A Kinetic Assessment," Journal of Food Engineering, vol. 61, Dec. 31, 2004, pp. 143-152, XP000002657382.

Davda, R.R. et al., "A Review of Catalystic Issues and Process Conditions for Renewable Hydrogen and Alkanes by Aqueous-Phase Reforming of Oxygenated Hydrocarbons Over Supported Metal Catalysts," Applied Catalysis, B:Environmental, p. 1-16 (2004).

Davda, R.R., et al., "Catalytic Reforming of Oxygenated Hydrocarbons for Hydrogen with Low Levels of Carbon Monoxide," Angewandte Chemie International 42: 4068-4071 (2003).

Huber, G.W., et al., "Production of Liquid Alkanes by Aqueous-Phase Processing of Biomass-Derived Carbohydrates," Science 308: 1446-1450 (2005).

Huber, G.W., et al., "Renewable Alkanes by Aqueous-Phase Reforming of Biomass-Derived Oxygenates," Angewandte Chemie International 43: 1549-1551 (2004).

Shabaker, J.W., et al., "Aqueous-Phase Reforming of Ethylene Glycol Over Supported Platinum Catalysts," Catalysis Letters 88:1-8 (2003).

Shabaker, J.W., et al., "Sn-modified Ni Catalysts for Aqueous-Phase Reforming: Characterization and Deactivation Studies," Journal of Catalysis 231:67-76 (2005).

Badger, P.C., "Ethanol From Cellulose: A General Review," Ethanol From Cellulose: A General Review p. 17-21 (2002).

Bardin, B.B., et al., "Acidity of Keggin-Type Heteropolycompounds Evaluated by Catalytic Probe Reactions, Sorption Microcalorimetry, and Density Functional Quantum Chemical Calculations," J. Phys. Chem. B 102-10817-10825 (1998).

Barrett, C.J., et al., "Single-Reactor Process for Sequential Aldol-Condensation and Hydrogenation of Biomass-Derived Compounds in Water," Applied Catalysis B: Environmental 66:111-118 (2006).

Brown, N. F., et al., "Carbon-Halogen Bond Scission and Rearrangement of Beta-Halohydrins on the Rh(111) Surface," J. Phys. Chem. 98:12737-12745 (1994).

Chen, N. Y., et al., "Liquid Fuel From Carbohydrates," Chemtech Aug. 1986 p. 506-509.

Chiu, C.W., et al., "Distribution of Methanol and Catalysts Between Biodiesel and Glycerin Phases," AIChE Journal 51:1274-1278 (2005).

Corma, A., et al., "Processing Biomass-Derived Oxygenates in The Oil Refinery: Catalytic Cracking (FCC) Reaction Pathways and Role of Catalyst," J. of Catalysis 247:307-327 (2007).

Cortright, R.D., et al., "Hydrogen From Catalytic Reforming of Biomass-Derived Hydrocarbons in Liquid Water," Nature 418:964-967 (2002).

Dasari, M.A., et al., "Low-Pressure Hydrogenolysis of Glycerol to Propylene Glycol," Applied Catalysis A: General 281:225-231 (2005).

Dass, D.V., et al., "A Comparative Study of the Conversion of Ethanol and of Ethylene Over the "Mobil" Zeolite Catalyst, H-ZSM-5. An Application of the Benzene Sequestration Test," Can. J. Chem. 67:1732-1734 (1989).

Davda, R.R., et al., "Aqueous-Phase Reforming of Ethylene Glycol on Silica-Supported Metal Catalysts," Applied Catalysis B: Environment 43:13-26 (2003).

Dos Santos, S.M., et al., "Performance of RuSn Catalysts Supported on different Oxides in the Selective Hydrogenation of Dimethyl Adipate," Catalysis Today 107-108:250-257 (2005).

Elliott, D.C., et al., "Chemical Processing in High-Pressure Aqueous Environments. 2. Development of Catalyts for Gasification," Ind. Eng. Chem. Res. 32: 1542-1548 (1993).

Elliott, D.C., et al., "Liquid Fuels by Low-Severity Hydrotreating of Biocrude," Developments in Thermochemical Biomass Conversion 1:611-621 (1996).

Elliott, D.C., et al., "Chemical Processing in High-Pressure Aqueous Environments 6. Demonstration of Catalytic Gasification for Chemical Manufacturing Wastewater Cleanup in Industrial Plants," Ind. Eng. Chem. Res. 38:879-883 (1999).

Fraser, J., "Roadmap for Cellulosic Ethanol Production".

Fukuoka, A., et al., "Catalytic Conversion of Cellulose Into Sugar Alcohols," Angew. Chem. Int. Ed. 5:5161-5163 (2006).

Gayubo, A.G., et al., "Transformation of Oxygenate Components of Biomass Pyrolysis Oil on a HZSM-5 Zeolite. I. Alcohols and Phenols," Ind. Eng. Chem. Res. 43:2610-2618 (2004).

Greer, D., "Creating Cellulosic Ethanol: Spinning Straw Into Fuel," May 2005 eNews Bulletin.

Huber, G.W., et al., "Raney Ni—Sn Catalyst for H2 Production From Biomass-Derived Hydrocarbons," Science 300:2075-2077 (2003).

Huber, G.W., et al., "Synthesis of Transportation Fuels From Biomass: Chemistry, Catalysts, and Engineering," Chem. Rev. 106: 4044-4098 (2006).

Kawai, M., et al., "Production of Hydrogen and Hydrocarbon From Cellulose and Water," Chemistry Letters p. 1185-1188 (1981).

Kluson, P., et al., "Selective Hydrogenation Over Ruthenium Catalysts," Applied Catalysis A: General 128:13-31 (1995).

Makarova, M.A., et al., "Dehydration of n-Butanol on Zeolite H-ZSM-5 and Amorphous Aluminosilicate: Detailed Mechanistic Study and the Effect of Pore Confinement," Journal of Catalysis 149:36-51 (1994).

Minowa, T., et al. "Hydrogen Production From Wet Cellulose by Low Temperature Gasification Using a Reduced Nickel Catalyst," Chemistry Letters p. 937-938 (1995).

Minowa, T., et al., "Hydrogen Production From Cellulose in Hot Compressed Water Using Reduced Nickel Catalyst: Product Distribution At Different Reaction Temperature," J. of Chem. Eng. Of Japan 31:488-491 (1998).

Nelson, D.A., et al., "Application of Direct Thermal Liquefaction for the Conversion of Cellulosic Biomass," Ind. Eng. Chem. Prod. Res. Dev. 23:471-475 (1984).

Oregon Cellulose-Ethanol Study, "Appendix B—Overview of Cellulose-Ethanol Production Technology," p. 57-60.

Roman-Leshkov, Y., et al., "Production of Dimethylfuran for Liquid Fuels From Biomass-Derived Carbohydrates," Nature 447:982-986 (2007).

Rostrup-Nielsen, J.R., "Conversion of Hydrocarbons and Alcohols for Fuel Cells," Phys. Chem. Chem. Phys. 3:283-288 (2001).

Shabaker, J.W., et al., "Aqueous-Phase Reforming of Methanol and Ethylene Glycol over Alumina-Supported Platinum Catalysts," Journal of Catalysis 215:344-352 (2003).

Shabaker, J.W., et al., "Aqueous-Phase Reforming of Oxygenated Hydrocarbons Over Sn-Modified Ni Catalysts," Journal of Catalysis 222:180-191 (2004).

Silva, A.M., et al., "Role of Cata yst Preparation on Determining Selective Sites for Hydrogenation of Dimethyl Adipate Over RuSn/Al2O3," J. of Molecular Catalysis A: Chemical 253:62-69 (2006).

Tsuchida, T., et al., "Direct Synthesis of n-Butanol From Ethanol Over Nonstoichiometric Hyroxyapatite," Ind. Eng. Chem. Res. 45:8634-9642 (2006).

Wang, D., et al., "Catalytic Stream Reforming of Biomass-Derived Oxygenates: Acetic Acid and Hydroxyacetaldehyde," Applied Catalysis A: General 143:245-270 (1996).

Werpy, T., et al., "Top Value Added Chemicals From Biomass vol. 1-Results of Screening for Potential Candidates From Sugars and Synthesis Gas." (2004).

Yoshida, T., et al., "Gasification of Cellulose, Xylan, and Lignini Mixtures in Supercritical Water," Ind. Eng. Chem. Res. 40:5469-5474 (2001).

Blommel, P. G. et al., "Production of Conventional Liquid Fuels from Sugars," Aug. 25, 2008, pp. 1-14, Retrieved from the Internet: URL:http://www.Virent.com/BioForming/Virent_Technology_Whitepaper.pdf.

Zhou, J. H. et al., "Carbon nanofiber/graphite-felt composite supported Ru catalysts for hydrogenolysis of sorbitol," Catalysis Today, Elsevier, NL, vol. 147, Sep. 1, 2009, pp. S225-S229.

Clark, I. T., "Hydrogenolysis of Sorbitol," Industrial and Engineering Chemistry, American Chemical Society, US, vol. 50, No. 8, Jan. 1, 1958, pp. 1125-1126.

(56) References Cited

OTHER PUBLICATIONS

Denmark, Scott E. and Beuthner, Gregory L., "Lewis Base Catalysis in Organic Synthesis," Angew Chem. Int. Ed. 2008, 47, pp. 1560-1638.
Tanabe, K., Misono, M., Ono, Y., Hattori, H., "New Solid Acids and Bases," Kodansha/Elsevier, Tokyo/Amsterdam, 1989, pp. 260-267.
Gines, M., Iglesia, E., "Bifunctional Condensation Reactions of Alcohols on Basic Oxides Modified by Copper and Potassium," Journal of Catalysis, 1998, 176, pp. 155-172.
U.S. Appl. No. 12/972,141, filed Dec. 17, 2010, Chheda et al.
U.S. Appl. No. 12/972,154, filed Dec. 17, 2010, Chheda et al.
U.S. Appl. No. 13/106,528, filed May 12, 2011, Chheda et al.
da Cunha, A. F. et al., "Indutrial Potential of Yeast Biotechnology in the Production of Bioethanol in Brazil: The Example of Conditional Flocculation", Industrial Persepctives for Bioethanol, Dec. 31, 2006, Institute of Biology, Department of Genetics and Evolution, State University of Capinas—UNICAMP, Campinas, SP—Brazil.
Lehr, V. et al., "Catalytic Dehydration of Biomass-Derived Poiyois in Sub-and Supercritical Water", Catalysis Today, vol. 121, 2007, pp. 121-129.
Valenzuela, M. B. et al., "Batch Aqueous Phase Reforming of Woody Biomass", Energy & Fuels, vol. 20, Jun. 2006, pp. 1744-1752.

\* cited by examiner

BIOFUELS VIA HYDROGENOLYSIS AND DEHYDROGENATION-CONDENSATION

The present application claims the benefit of pending U.S. Provisional Patent Application Ser. No. 61/333,916, filed May 12, 2010 the entire disclosure of which is hereby incorporated by reference.

FIELD OF THE INVENTION

The invention relates to the production of higher hydrocarbons suitable for use in transportation fuels and industrial chemicals from bio-based feedstocks.

BACKGROUND OF THE INVENTION

A significant amount of effort has been placed on developing new methods and systems for providing energy from resources other than fossil fuels. Bio-based feedstocks are a resource that show promise as a renewable alternative source of hydrocarbons for producing fuel and chemicals.

Bio-based feedstocks including carbohydrates and "biomass" are materials derived from living or recently living biological materials. One type of biomass is cellulosic biomass. Cellulosic biomass is the most abundant source of carbohydrate in the world due to the lignocellulosic materials composing the cell walls. The ability to convert biomass to fuels, chemicals, energy and other materials is expected to strengthen the economy, minimize dependence on oil and gas resources, reduce air and water pollution, and decrease the net rate of carbon dioxide production.

There are many challenges to overcome in developing processes of converting carbohydrates to higher hydrocarbons suitable for use in transportation fuels. For example, the processes used are costly and complex making it difficult to compete with the use of traditional resources, such as fossil fuels. U.S. Patent Application Publication No. 2007/0142633 (Yao et al.) refers to a process for the conversion of carbohydrates to higher hydrocarbons. An ion-exchange resin is provided to convert the carbohydrates into usable reaction products. The reaction products are hydrogenated, and then contacted with a zeolite containing catalyst to form higher hydrocarbons. The conversion of carbohydrates to hydrocarbons in this system results in increased loss of desirable hydrocarbon products due to the formation of unwanted byproducts, such as coke, carbon dioxide, and carbon monoxide. Thus, another challenge for promoting and sustaining the use of biomass is the need to eliminate the formation of undesirable byproducts such as carbon monoxide, carbon dioxide, and coke. A further challenge is to complete the conversion of carbohydrates to higher hydrocarbons in a limited number of steps, to obtain high yields with minimal capital investment.

Current methods for converting sugars to fuel proceed through a biological route, such as yeast fermentation, to ethanol. However, ethanol does not have a high energy density when compared to standard transportation fuels. Currently, there is a need for the creation of liquid biofuels of greater energy density than ethanol, which can make use of existing fuel infrastructure. Moreover, what is needed is a method and system that provides efficient and high yield production of higher hydrocarbons suitable for use in transportation fuels and industrial chemicals from bio-based feedstocks while avoiding or minimizing the production of unwanted by-products.

SUMMARY OF THE INVENTION

In an embodiment, a method comprises providing a carbohydrate feed; contacting at least a portion of the carbohydrate feed directly with hydrogen in the presence of a hydrogenolysis catalyst to produce a first reaction product comprising stable hydroxyl intermediates; contacting at least a portion of the first reaction product comprising the stably hydroxyl intermediates with a dehydrogenation catalyst to form a second reaction product; and contacting at least a portion of the second reaction product with a condensation catalyst comprising a base functionality to form a fuel blend.

In another embodiment, a method comprises providing a source of bio-based feedstock; treating the bio-based feedstock so as to form a stream comprising a carbohydrate; reacting at least a portion of the stream comprising the carbohydrate in a hydrogenolysis reaction to produce first reaction product stream comprising a stable hydroxyl intermediate stream comprising higher polyols; separating at least a first portion of the higher polyols from the stable hydroxyl intermediate stream; recycling the first portion of the higher polyols through the hydrogenolysis reaction to produce additional stable intermediates; contacting at least a portion of the stable hydroxyl intermediates with a dehydrogenation catalyst to form a second reaction product stream; and contacting at least a portion of the second reaction product stream with a condensation catalyst comprising a base functionality to form a fuel blend.

In still another embodiment, a system comprises a first vessel comprising a hydrogenolysis catalyst that receives a carbohydrate and produces a stable hydroxyl intermediate; a second vessel comprising a dehydrogenation catalyst that receives the stable hydroxyl intermediate and produces a carbonyl-containing compound; and a processing reactor comprising a condensation catalyst that receives the carbonyl-containing compound and produces a fuel blend, where the condensation catalyst comprises a base functionality.

The features and advantages of the invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the invention, and should not be used to limit or define the invention.

DETAILED DESCRIPTION OF THE INVENTION

The invention relates to methods and systems for producing higher hydrocarbons from bio-based feedstocks, such as carbohydrates, which include sugars, sugar alcohols, celluloses, lignocelluloses, hemicelluloses, lignocellulosic biomass, and any combination thereof, to form higher hydrocarbons suitable for use in transportation fuels and industrial chemicals, while minimizing the formation of undesirable by-products such as coke, carbon dioxide, and carbon monoxide. The higher hydrocarbons produced are useful in forming transportation fuels, such as synthetic gasoline, diesel fuel, and jet fuel, as well as industrial chemicals. As used herein, the term "higher hydrocarbons" refers to hydrocarbons having an oxygen to carbon ratio less than at least one component of the bio-based feedstock. As used herein the term "hydrocarbon" refers to an organic compound comprising primarily hydrogen and carbon atoms, which is also an unsubstituted hydrocarbon. In certain embodiments, the hydrocarbons of the invention also comprise heteroatoms (e.g., oxygen or sulfur) and thus the term "hydrocarbon" may also include substituted hydrocarbons.

Figure 1:
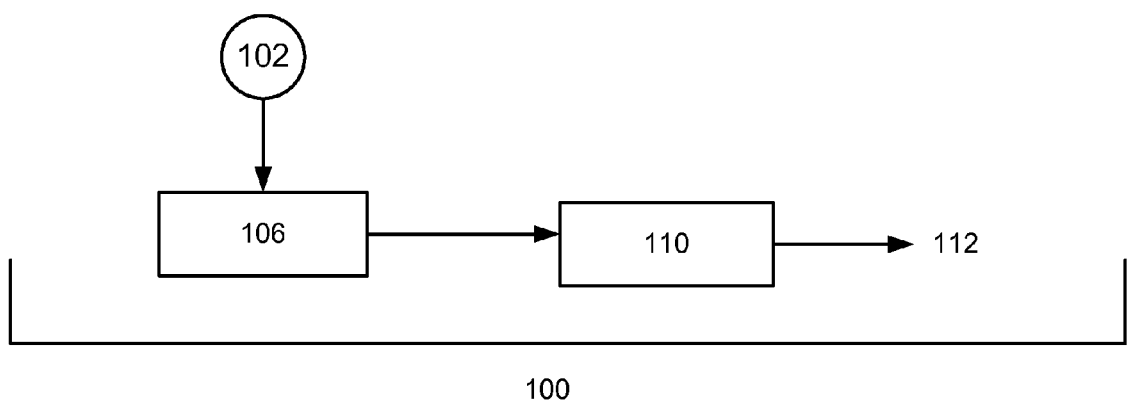
FIG. 1 schematically illustrates a block flow diagram of an embodiment of a higher hydrocarbon production process of this invention.
Figure 2:
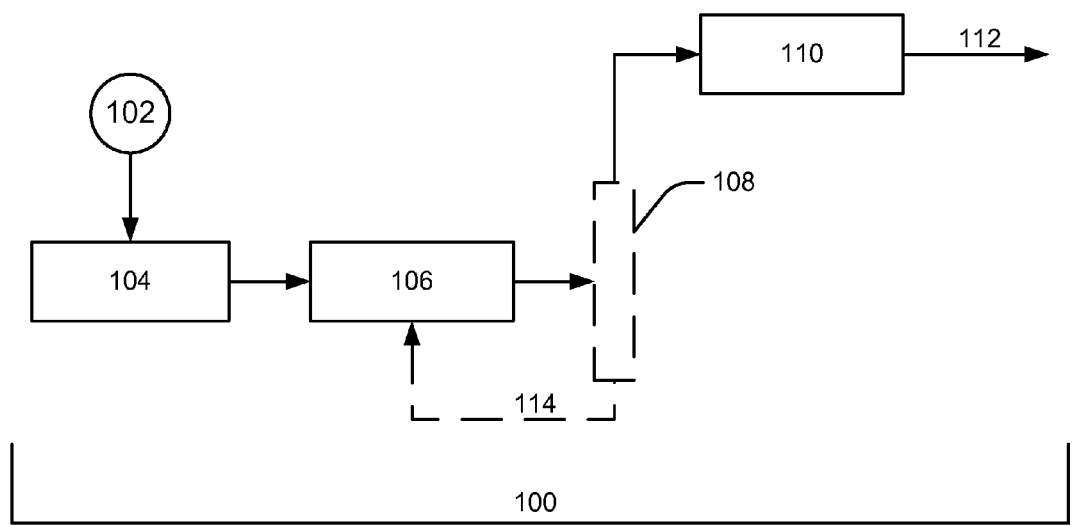
FIG. 2 schematically illustrates a block flow diagram of another embodiment of a higher hydrocarbon production process of this invention.
Figure 3:
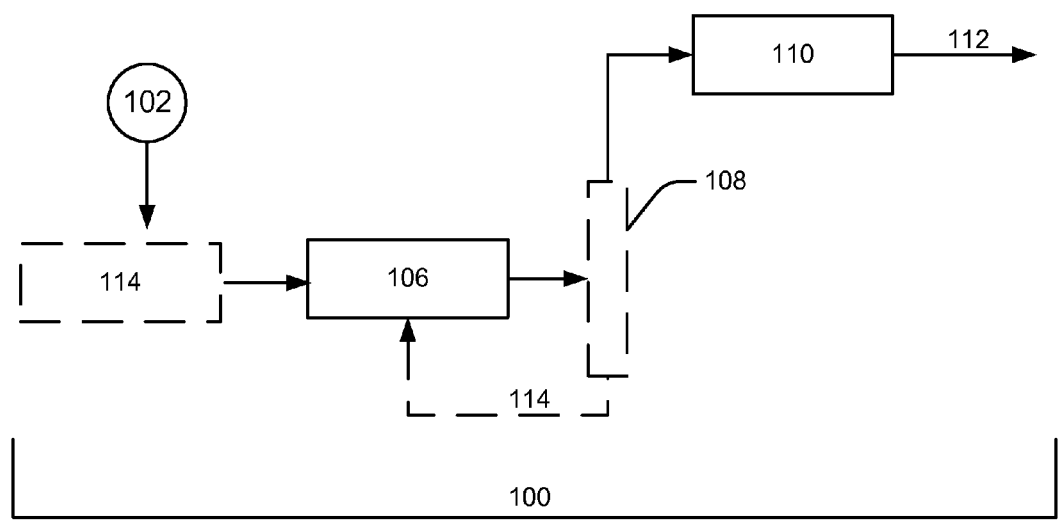
FIG. 3 schematically illustrates a block flow diagram of another embodiment of a higher hydrocarbon production process of this invention.

FIG. 1 illustrates an embodiment of a process 100 according to the present invention. Alternate embodiments are illustrated in FIGS. 2-3. In the embodiment shown in FIG. 1, a feedstock solution comprising water and optional solvent with soluble carbohydrate 102 is catalytically reacted with hydrogen in a hydrogenolysis reaction 106 to produce a stable hydroxyl intermediate. The stable hydroxyl intermediate can be further catalytically reacted in processing reaction 110 to produce a higher hydrocarbon stream 112. Higher hydrocarbon stream 112 may be blended in a downstream process with additional streams to create fuels or industrial chemicals. Suitable stable hydroxyl intermediates may include, but are not limited to, alcohols, polyols, and any combination thereof. Suitable processing reactions include, but are not limited to, a dehydrogenation reaction, a dehydration reaction, a condensation reaction, a hydrogenation reaction, a hydrotreating reaction, an isomerization reaction, and any combination thereof.

In the embodiment shown in FIG. 2, a feedstock solution comprising water soluble carbohydrate 102 is catalytically reacted with hydrogen in a hydrogenation reaction 104 and/or hydrogenolysis reaction 106 to produce an stable hydroxyl intermediate. The stable hydroxyl intermediate can then be passed through an optional separation device 108, and any suitable alcohols or polyols are further catalytically reacted in processing reaction 110 to produce a higher hydrocarbon stream 112. Higher hydrocarbon stream 112 may be blended in a downstream process with additional streams to create fuels or industrial chemicals. Suitable stable hydroxyl intermediates may include, but are not limited to, alcohols, polyols, and any combination thereof. Higher polyols may be recycled back through the hydrogenolysis reaction 106 through recycle stream 114 to produce additional suitable alcohol and polyol compounds. As used herein, the term "higher polyol" refers to compound with more than one hydroxyl group, and more than two carbon atoms. Suitable processing reactions include, but are not limited to, a dehydrogenation reaction, a dehydration reaction, a condensation reaction, a hydrogenation reaction, a hydrotreating reaction, an isomerization reaction, and any combination thereof.

In the embodiment shown in FIG. 3, a feedstock solution comprising water soluble carbohydrate 102 is optionally hydrolyzed through a hydrolysis reaction 114 and further catalytically reacted with hydrogen in a hydrogenolysis reaction 106 to produce stable hydroxyl intermediates. The stable hydroxyl intermediates are then passed through an optional separation device 108, and any suitable alcohols or polyols are further catalytically reacted in processing reaction 110 to produce a higher hydrocarbon stream 112. Higher hydrocarbon stream 112 may be blended in a downstream process with additional streams to create fuels or industrial chemicals. Suitable stable hydroxyl intermediates may include, but are not limited to, alcohols, polyols, and any combination thereof. Higher polyols may be recycled back through the hydrogenolysis reaction 106 through recycle stream 114 to produce additional suitable alcohol and polyol reaction products.

In certain embodiments, the hydrolysis reaction, hydrogenation reaction, hydrogenolysis reaction, and processing reactions described in the present invention could be conducted in a single step.

In an embodiment, the reactions described below are carried out in any system of suitable design, including systems comprising continuous-flow, batch, semi-batch, or multi-system vessels and reactors. One or more reactions may take place in an individual vessel and the process is not limited to separate reaction vessels for each reaction. In an embodiment, the invention utilizes a fixed or fluidized catalytic bed system. Preferably, the invention is practiced using a continuous-flow system at steady-state.

The methods and systems of the invention have the advantage of converting bio-based feedstocks, optionally without any additional costly purification steps to form higher energy density product of lower oxygen/carbon ratio including higher alkanes, olefins, and aromatics. The invention also reduces the amount of unwanted byproducts, thereby improving the overall yield of converting carbohydrates to higher hydrocarbons. Another advantage of the present invention includes the use of similar catalysts for multiple reaction steps, offering the potential to combine reactions when desired. A further advantage of the present invention provides the combination or elimination of steps required to convert bio-based feedstocks to fuel, thereby reducing capital costs. While not intending to be limited by theory, it is believed that some carbohydrates may thermally degrade at the conditions needed to produce higher hydrocarbons. In addition, the inclusion of some higher polyols in a reaction to form high hydrocarbons may result in excessive condensation so that the resulting higher hydrocarbons are unusable for transportation fuels (e.g., tars). As an advantage of the present process, the hydrogenolysis reaction may allow for the formation of stable hydroxyl intermediates that can withstand the conditions needed to form higher hydrocarbons and allow for the formation of desired higher hydrocarbons that may be used for fuels or as other industrial chemicals. Advantages of specific embodiments will be described in more detail below.

An embodiment of the invention comprises providing a carbohydrate feed; contacting at least a portion of the carbohydrate feed directly with hydrogen in the presence of a hydrogenolysis catalyst to produce a first reaction product comprising stable hydroxyl intermediates; contacting at least a portion of the first reaction product comprising the stable hydroxyl intermediates with a dehydrogenation catalyst to form a second reaction product; and contacting at least a portion of the second reaction product with a condensation catalyst comprising a base functionality to form a fuel blend.

Carbohydrates are the most abundant, naturally occurring biomolecules. Plant materials store carbohydrates either as sugars, starches, celluloses, lignocelluloses, hemicelluloses, and any combination thereof. In one embodiment, the carbohydrates include monosaccharides, polysaccharides or mixtures of monosaccharides and polysaccharides. As used herein, the term "monosaccharides" refers to hydroxy aldehydes or hydroxy ketones that cannot be hydrolyzed to smaller units. Examples of monosaccharides include, but are not limited to, dextrose, glucose, fructose and galactose. As used herein, the term "polysaccharides" refers to saccharides comprising two or more monosaccharide units. Examples of polysaccharides include, but are not limited to, sucrose, maltose, cellobiose, cellulose and lactose. Carbohydrates are produced during photosynthesis, a process in which carbon dioxide is converted into organic compounds as a way to store energy. The carbohydrates are highly reactive compounds that can be easily oxidized to generate energy, carbon dioxide, and water. The presence of oxygen in the molecular structure of carbohydrates contributes to the reactivity of the compound. Water soluble carbohydrates react with hydrogen over catalyst(s) to generate stable hydroxyl intermediates comprising polyols and sugar alcohols, either by hydrogenation, hydrogenolysis or both.

In the embodiment shown in FIG. 1, the carbohydrates are optionally reacted in a hydrogenation reaction and then a hydrogenolysis reaction to form suitable stable hydroxyl intermediates that comprise alcohols and polyols for the condensation reaction 110. In an embodiment of the invention, the hydrogenation reaction is optional and the hydrogenolysis reaction alone is suitable to form the desired stable hydroxyl intermediates. In another embodiment of the invention, the carbohydrates are passed through the hydrogenolysis reaction prior to being passed through the hydrogenation reaction (thus hydrogenolysis reaction 106 and hydrogenation reaction 104 are reversed from the order shown in FIG. 1). In an embodiment of the invention, the hydrogenation and hydrogenolysis reactions occur in the same vessel to generate stable hydroxyl intermediates to be fed into a processing reaction. In an embodiment, a separation step (e.g., water removal) could be conducted prior to the hydrogenolysis reaction.

The carbohydrates may originate from any suitable source. In an embodiment, the carbohydrates fed to the process may be derived from an organic source (e.g., sugars and starches from corn or sugarcane). In another embodiment, the carbohydrates are derived from bio-based feedstocks. Bio-based feedstocks can include biomass. As used herein, the term "biomass" means organic materials produced by plants (e.g., leaves, roots, seeds and stalks), and microbial and animal metabolic wastes. Common sources of biomass include: agricultural wastes (e.g., corn stalks, straw, seed hulls, sugarcane leavings, bagasse, nutshells, and manure from cattle, poultry, and hogs); wood materials (e.g., wood or bark, sawdust, timber slash, and mill scrap); municipal waste, (e.g., waste paper and yard clippings); and energy crops, (e.g., poplars, willows, switch grass, alfalfa, prairie bluestream, corn, and soybean). The term "biomass" also refers to the primary building blocks of all the above, including, but not limited to, saccharides, lignins, celluloses, hemicelluloses, and starches. Useful carbohydrates in the invention include, but are not limited to, carbohydrates that can be converted to hydrocarbons under suitable reaction conditions. Suitable carbohydrates in the invention include any carbohydrate soluble in water or an organic solvent having one or more carbon atoms and at least one oxygen atom. The carbohydrates may also have an oxygen to carbon ratio from about 0.5:1 to about 1:1.2.

In one embodiment of the invention, the bio-based feedstock is optionally first hydrolyzed in a liquid medium such as an aqueous solution or aqueous solution with organic solvent (e.g., a recycled portion of the stable hydroxyl intermediates), to obtain a soluble carbohydrate stream for use in the process. Various biomass hydrolysis methods may be suitable, including, but not limited to, acid hydrolysis, alkaline hydrolysis, enzymatic hydrolysis, and hydrolysis using hot-compressed water. In certain embodiments, the hydrolysis reaction can occur at a temperature between 100° C. and 250° C. and pressure between 0.1 MPa and 10,000 kPa. In embodiments including strong acid and enzymatic hydrolysis, the hydrolysis reaction can occur at temperatures as low as ambient temperature and pressure between 100 kPa and 10,000 kPa. In some embodiments, the hydrolysis reaction may comprise a hydrolysis catalyst (e.g., a metal or acid catalyst) to aid in the hydrolysis reaction. The hydrolysis catalyst can be any catalyst capable of effecting a hydrolysis reaction. For example, suitable hydrolysis catalysts include, but are not limited to, acid catalysts, base catalysts, metal catalysts, and any combination thereof. Acid catalysts can include organic acids such as acetic acid, formic acid, and levulinic acid. In an embodiment, the acid catalyst can be generated as a byproduct during the hydrogenation and/or hydrogenolysis reactions. In certain embodiments, the hydrolysis of the bio-based feestocks can occur in conjunction with the hydrogenation and/or hydrogenolysis reactions. In such embodiments, a co-catalyst or catalytic support may be added to the hydrogenation and/or hydrogenolysis reactions to facilitate the hydrolysis reaction.

Various factors affect the conversion of the bio-based feedstock in the hydrolysis reaction. In some embodiments, hemicellulose can be extracted from the bio-based feedstock within an aqueous fluid and hydrolyzed at temperatures below 160° C. to produce a C5 carbohydrate fraction. At increasing temperatures, this C5 fraction can be thermally degraded. It is therefore advantageous to convert the C5, C6, or other sugar intermediates directly into more stable intermediates such as sugar alcohols. By recycling a portion of the stable hydroxyl intermediates from the hydrogenation and/or hydrogenolysis reactions and performing additional biomass hydrolysis with this recycled liquid, the concentration of active stable hydroxyl intermediates can be increased to commercially viable concentrations without water dilution. Typically, a concentration of at least 2%, or 5% or preferable greater than 8% of total organic intermediates (e.g., the recycled stable hydroxyl intermediates plus the hydrolyzed carbohydrates) in water, may be suitable for a viable process. This may be determined by sampling the intermediate stream at the outlet of the hydrolysis reaction and using a suitable technique such as chromatography to identify the concentration of total organics.

Cellulose extraction begins above 160° C., with solubilization and hydrolysis becoming complete at temperatures around 190° C., aided by organic acids (e.g., carboxylic acids) formed from partial degradation of carbohydrate components. Some lignins can be solubilized before cellulose, while other lignins may persist to higher temperatures. Organic in situ generated solvents, which may comprise a portion of the stable hydroxyl intermediates, including, but not limited to, light alcohols and polyols, can assist in solubilization and extraction of lignin and other components.

At temperatures ranging from 250° C. to 275° C., carbohydrates can degrade through a series of complex self-condensation reactions to form caramelans, which are considered degradation products that are difficult to convert to fuel products. In general, some degradation reactions can be expected with aqueous reaction conditions upon application of temperature, given that water will not completely suppress oligomerization and polymerization reactions.

The temperature of the hydrolysis reaction can be chosen so that the maximum amount of extractable carbohydrates are hydrolyzed and extracted as carbohydrates from the bio-based feedstock while limiting the formation of degradation products. In some embodiments, a plurality of reactor vessels may be used to carry out the hydrolysis reaction. These vessels may have any design capable of carrying out a hydrolysis reaction. Suitable reactor vessel designs can include, but are not limited to, co-current, counter-current, stirred tank, and/or fluidized bed reactors. In this embodiment, the bio-based feedstock may first be introduced into a reactor vessel operating at approximately 160° C. At this temperature the hemicellulose may be hydrolyzed to extract the C5 carbohydrates and some lignin without degrading these products. The remaining bio-based feedstock solids may then exit the first reactor vessel and pass to a second reactor vessel. The second vessel may be operated between 160° C. and 250° C. so that the cellulose is further hydrolyzed to form C6 carbohydrates. The remaining bio-based feedstock solids may then exit the second reactor as a waste stream while the intermediate stream from the second reactor can be cooled and combined with the intermediate stream from the first reactor vessel. The combined outlet stream may then pass to the hydrogenation and/or hydrogenolysis reactors. In another embodiment, a series of reactor vessels may be used with an increasing temperature profile so that a desired carbohydrate fraction is extracted in each vessel. The outlet of each vessel can then be cooled prior to combining the streams, or the streams can be individually fed to the hydrogenation/and or hydrogenolysis reaction for conversion of the intermediate carbohydrate streams to one or more stable hydroxyl intermediate streams.

In another embodiment, the hydrolysis reaction may take place in a single vessel. This vessel may have any design capable of carrying out a hydrolysis reaction. Suitable reactor vessel designs can include, but are not limited to, co-current, counter-current, stirred tank, or fluidized bed reactors. In some embodiments, a counter-current reactor design is used in which the bio-based feedstock flows counter-current to the aqueous stream, which may comprise an in situ generated solvent. In this embodiment, a temperature profile may exist within the reactor vessel so that the temperature within the hydrolysis reaction media at or near the bio-based feedstock inlet is approximately 160° C. and the temperature near the bio-based feedstock outlet is approximately 200° C. to 250° C. The temperature profile may be obtained through the introduction of an aqueous fluid comprising an in situ generated solvent above 200° C. to 250° C. near the bio-based feedstock outlet while simultaneously introducing a bio-based feedstock at 160° C. or below. The specific inlet temperature of the aqueous fluid and the bio-based feedstock will be determined based on a heat balance between the two streams. The resulting temperature profile may be useful for the hydrolysis and extraction of cellulose, lignin, and hemicellulose without the substantial production of degradation products.

Other means may be used to establish an appropriate temperature profile for the hydrolysis reaction and extraction of cellulose and hemicellulose along with other components such as lignin without substantially producing degradation products. For example, internal heat exchange structures may be used within one or more reaction vessels to maintain a desired temperature profile for the hydrolysis reaction. Other structures as would be known to one of ordinary skill in the art may also be used.

Each reactor vessel of the invention preferably includes an inlet and an outlet adapted to remove the product stream from the vessel or reactor. In some embodiments, the vessel in which hydrolysis reaction or some portion of the hydrolysis reaction occurs may include additional outlets to allow for the removal of portions of the reactant stream to help maximize the desired product formation. A backmixed reactor (e.g., a stirred tank, a bubble column, and/or a jet mixed reactor) may be employed if the viscosity and characteristics of the partially digested bio-based feedstock and liquid reaction media is sufficient to operate in a regime where bio-based feedstock solids are suspended in an excess liquid phase (as opposed to a stacked pile digester).

It is understood that in one embodiment, the biomass does not need to be hydrolyzed, as the carbohydrate containing biomass may already be in suitable aqueous form (e.g., raw cane juice concentrate) for converting the bio-based feedstock to higher hydrocarbons.

In an embodiment of the invention, the intermediate carbohydrate stream produced by the hydrolysis reaction may be converted to stable hydroxyl intermediates including, but not limited to, polyols, and alcohols. In general, without being limited by any particular theory, a suitable conversion reaction or reactions can include, without limitation: hydrogenolysis, consecutive hydrogenation-hydrogenolysis, consecutive hydrogenolysis-hydrogenation, and combined hydrogenation-hydrogenolysis reactions, resulting in the formation of stable hydroxyl intermediates that can be easily converted to higher hydrocarbons by one or more processing reactions.

In an embodiment of the invention, it is desirable to convert the carbohydrates and optionally a portion of the stable hydroxyl intermediates to smaller molecules that will be more readily converted to desired higher hydrocarbons. A suitable method for this conversion is through a hydrogenolysis reaction.

Various processes are known for performing hydrogenolysis of carbohydrates. One suitable method includes contacting a carbohydrate or stable hydroxyl intermediate with hydrogen or hydrogen mixed with a suitable gas and a hydrogenolysis catalyst in a hydrogenolysis reaction under conditions sufficient to form a reaction product comprising smaller molecules or polyols. Most typically, hydrogen is dissolved in the liquid mixture of carbohydrate, which is in contact with the catalyst under conditions to provide catalytic reaction. At least a portion of the carbohydrate feed is contacted directly with hydrogen in the presence of the hydrogenolysis catalyst. By the term "directly", the reaction is carried out on at least a portion of the carbohydrate without necessary stepwise first converting all of the carbohydrates into a stable hydroxyl intermediate. As used herein, the term "smaller molecules or polyols" includes any molecule that has a lower molecular weight, which can include a smaller number of carbon atoms or oxygen atoms than the starting carbohydrate. In an embodiment, the reaction products include smaller molecules that include polyols and alcohols.

In an embodiment, a carbohydrate (e.g., a 5 and/or 6 carbon carbohydrate molecule) can be converted to stable hydroxyl intermediates comprising propylene glycol, ethylene glycol, and glycerol using a hydrogenolysis reaction in the presence of a hydrogenolysis catalyst. The hydrogenolysis catalyst may include Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. The promoters may allow for hydrogenation and hydrogenolysis reactions to occur at the same time. The hydrogenolysis catalyst can also include a carbonaceous pyropolymer catalyst containing transition metals (e.g., chromium, molybdemum, tungsten, rhenium, manganese, copper, cadmium) or Group VIII metals (e.g., iron, cobalt, nickel, platinum, palladium, rhodium, ruthenium, iridium, and osmium). In certain embodiments, the hydrogenolysis catalyst can include any of the above metals combined with an alkaline earth metal oxide or adhered to a catalytically active support. In certain embodiments, the catalyst described in the hydrogenolysis reaction can include a catalyst support as described herein for the hydrogenation reaction.

The conditions for which to carry out the hydrogenolysis reaction will vary based on the type of starting material and the desired products. One of ordinary skill in the art, with the benefit of this disclosure, will recognize the appropriate conditions to use to carry out the reaction. In general, the hydrogenolysis reaction is conducted at temperatures of 110° C. to 300° C., and preferably at 170° C. to 220° C., and most preferably at 180° C. to 225° C. In an embodiment, the hydrogenolysis reaction is conducted under basic conditions, preferably at a pH of 8 to 13, and even more preferably at a pH of 10 to 12. In an embodiment, the hydrogenolysis reaction is conducted at pressures in a range between 60 kPa and 16500 kPa, and preferably in a range between 1700 kPa and 14000 kPa, and even more preferably between 4800 kPa and 11000 kPa.

The hydrogen used in the hydrogenolysis reaction of the current invention can include external hydrogen, recycled hydrogen, in situ generated hydrogen, and any combination thereof.

In an embodiment, the use of a hydrogenolysis reaction may produce less carbon dioxide and a greater amount of polyols than a reaction that results in reforming of the reactants. For example, reforming can be illustrated by formation of isopropanol (i.e., IPA, or 2-propanol) from sorbitol:

$$C_6H_{14}O_6 + H_2O \rightarrow 4H_2 + 3CO_2 + C_3H_8O; \ dHR = -40 \ J/gmol \quad \text{(Eq. 1)}$$

Alternately, in the presence of hydrogen, polyols and mono-oxygenates such as IPA can be formed by hydrogenolysis, where hydrogen is consumed rather than produced:

$$C_6H_{14}O_6 + 3H_2 \rightarrow 2H_2O + 2C_3H_8O_2; \ dHR = +81 \ J/gmol \quad \text{(Eq. 2)}$$

$$C_6H_{14}O_6 + 5H_2 \rightarrow 4H_2O + 2C_3H_8O; \ dHR = -339 \ J/gmol \quad \text{(Eq. 3)}$$

As a result of the differences in the reaction conditions (e.g., temperatures below 250° C.), the products of the hydrogenolysis reaction may comprise greater than 25% by mole, or alternatively, greater than 30% by mole, of polyols, which may result in a greater conversion in a processing reaction. In addition, the use of a hydrolysis reaction rather than a reaction running at reforming conditions may result in less than 20% by mole, or alternatively less than 30% by mole carbon dioxide production.

In an embodiment, hydrogenolysis is conducted under neutral or acidic conditions, as needed to accelerate hydrolysis reactions in addition to the hydrogenolysis.

In an embodiment of the invention, a hydrolyzed, substantially hydrolyzed, or non-hydrolyzed biomass-derived carbohydrate may converted into an stable hydroxyl intermediate comprising the corresponding alcohol derivative through a hydrogenolysis reaction in addition to an optional hydrogenation reaction in a suitable hydrogenation reaction vessel (such as hydrogenation reaction 104 in FIG. 1).

The carbohydrates, stable hydroxyl intermediates from the hydrolysis reaction, or both may take place in a hydrogenation reaction to saturate one or more unsaturated bonds. Various processes are suitable for hydrogenating carbohydrates, stable hydroxyl intermediates or both. One method includes contacting a feed stream with hydrogen or hydrogen mixed with a suitable gas and a catalyst under conditions sufficient to cause a hydrogenation reaction to form a hydrogenated product. The hydrogenation catalyst generally can include a Group VIII metal and/or a Group VI metal. Examples of such a catalyst can include, but is not limited to, Cu, Re, Ni, Fe, Co, Ru, Pd, Rh, Pt, Os, Ir, and alloys or any combination thereof, either alone or with promoters such as W, Mo, Au, Ag, Cr, Zn, Mn, Sn, B, P, Bi, and alloys or any combination thereof. Other effective hydrogenation catalyst materials include either supported nickel or ruthenium modified with rhenium. In an embodiment, the hydrogenation catalyst also includes any one of the supports described below, depending on the desired functionality of the catalyst. The hydrogenation catalysts may be prepared by methods known to those of ordinary skill in the art.

In an embodiment, the hydrogenation catalyst includes a supported Group VIII metal catalyst and a metal sponge material (e.g., a sponge nickel catalyst). Raney nickel provides an example of an activated sponge nickel catalyst suitable for use in this invention. In an embodiment, the hydrogenation reaction in the invention is performed using a catalyst comprising a nickel-rhenium catalyst or a tungsten-modified nickel catalyst. One example of a suitable catalyst for the hydrogenation reaction of the invention is a carbon-supported nickel-rhenium catalyst.

In an embodiment, a suitable Raney nickel catalyst may be prepared by treating an alloy of approximately equal amounts by weight of nickel and aluminum with an aqueous alkali solution, e.g., containing about 25 weight % of sodium hydroxide. The aluminum is selectively dissolved by the aqueous alkali solution resulting in a sponge shaped material comprising mostly nickel with minor amounts of aluminum. The initial alloy includes promoter metals (e.g., molybdenum or chromium) in the amount such that 1 to 2 weight % remains in the formed sponge nickel catalyst. In another embodiment, the hydrogenation catalyst is prepared using a solution of ruthenium(III) nitrosylnitrate, ruthenium (III) chloride in water to impregnate a suitable support material. The solution is then dried to form a solid having a water content of less than 1% by weight. The solid is then reduced at atmospheric pressure in a hydrogen stream at 300° C. (uncalcined) or 400° C. (calcined) in a rotary ball furnace for 4 hours. After cooling and rendering the catalyst inert with nitrogen, 5% by volume of oxygen in nitrogen is passed over the catalyst for 2 hours.

In certain embodiments, the catalyst described includes a catalyst support. The catalyst support stabilizes and supports the catalyst. The type of catalyst support used depends on the chosen catalyst and the reaction conditions. Suitable supports for the invention include, but are not limited to, carbon, silica, silica-alumina, zirconia, titania, ceria, vanadia, nitride, boron nitride, heteropolyacids, hydroxyapatite, zinc oxide, chromia, zeolites, carbon nanotubes, carbon fullerene and any combination thereof.

The catalysts used in this invention can be prepared using conventional methods known to those in the art. Suitable methods may include, but are not limited to, incipient wetting, evaporative impregnation, chemical vapor deposition, wash-coating, magnetron sputtering techniques, and the like.

The conditions for which to carry out the hydrogenation reaction will vary based on the type of starting material and the desired products. One of ordinary skill in the art, with the benefit of this disclosure, will recognize the appropriate reaction conditions. In general, the hydrogenation reaction is conducted at temperatures of 40° C. to 250° C., and preferably at 90° C. to 200° C., and most preferably at 100° C. to 150° C. In an embodiment, the hydrogenation reaction is conducted at pressures from 500 kPa to 14,000 kPa.

In some embodiments, a plurality of reactor vessels may be used to carry out the hydrogenation reaction. The plurality of vessels may be capable of carrying out a hydrogenation reaction without producing unwanted byproducts while minimizing degradation of wanted products. In an embodiment, the hydrogenation reaction may occur in two or more stages. In this embodiment, the bio-based feedstock may first be introduced into a first stage reaction operating at a temperature between 40° C. to 90° C. The products may then be exposed to a second stage reaction operating at a temperature between 80° C. to 120° C. The remaining products may then be exposed to a third stage operating at a temperature between 120° C. and 190° C. In an embodiment, the hydrogen used in the hydrogenation reaction of the current invention can include external hydrogen, recycled hydrogen, in situ generated hydrogen, and any combination thereof. As used herein, the term "external hydrogen" refers to hydrogen that does not originate from the bio-based feedstock reaction itself, but rather is added to the system from another source.

In an embodiment, the invention comprises a system having a first reactor for receiving a carbohydrate and producing a hydrogenated product. Each reactor of the invention preferably includes an inlet and an outlet adapted to remove the product stream from the reactor. In an embodiment, the reactors include additional outlets to allow for the removal of portions of the reactant stream to help maximize the desired product formation, and allow for collection and recycling of by-products for use in other portions of the system.

In an embodiment, the invention comprises a system having a second reactor for receiving the hydrogenated product and converting it into an alcohol and a polyol through a hydrolysis reaction. In certain embodiments, the hydrogenation and hydrogenolysis catalysts are the same and may exist in the same bed in the same vessel. Each reactor of the invention preferably includes an inlet and an outlet adapted to remove the product stream from the reactor. In an embodiment, the reactor may include additional outlets to allow for the removal of portions of the reactant stream to help maximize the desired product formation, and allow for collection and recycling of by-products for use in other portions of the system.

In an embodiment, the system of the invention includes elements that allow for the separation of the intermediate stream into different components to promote the desired products being fed into the desired reactors. For example, a suitable separator unit includes, but is not limited to, a phase separator, stripping column, extractor, or distillation column. In an embodiment of the invention, a separator is installed prior to a processing reaction to favor production of higher hydrocarbons by separating any higher polyols from the stable hydroxyl intermediates. In such an embodiment, the higher polyols and unconverted feed are recycled back through the hydrogenolysis reactor with the aid of an additional outlet, while the other reaction products are streamed to the condensation reactor.

In some embodiments, an outlet stream comprising at least a portion of the stable hydroxyl intermediates can pass to a processing reaction that may comprise a condensation reaction. In an embodiment, the oxygen to carbon ratio of the higher hydrocarbons produced through the condensation reaction is less than 0.5, alternatively less than 0.4, or preferably less than 0.3.

The stable hydroxyl intermediates can be processed to produce a fuel blend in one or more processing reactions. In an embodiment, a processing reaction can comprise an aldol condensation reaction, which can be used along with other reactions to generate a fuel blend and may be catalyzed by a catalyst comprising basic functional sites. In general, without being limited to any particular theory, it is believed that the basic condensation reactions generally consist of a series of steps involving: (1) a dehydrogenation reaction; (2) an optional dehydration reaction that may be acid catalyzed; (3) an aldol condensation reaction; (4) an optional ketonization reaction; (5) an optional furanic ring opening reaction; (6) hydrogenation of the resulting condensation products to form a C4+ hydrocarbon; and (7) any combination thereof. Additional polishing reactions may also be used to conform the product to a specific fuel standard. A catalyst comprising a basic functional site, both an acid and a basic functional site, and optionally comprising a metal function, may be used to effect the aldol condensation reaction. In an embodiment, a method of forming a fuel blend from a bio-based feedstock may comprise providing a source of bio-based feedstock; treating the bio-based feedstock so as to form a stream comprising a carbohydrate; reacting at least a portion of the stream comprising the carbohydrate in a hydrogenolysis reaction to produce first reaction product stream comprising a stable hydroxyl intermediate stream comprising higher polyols; separating at least a first portion of the higher polyols from the stable hydroxyl intermediate stream; recycling the first portion of the higher polyols through the hydrogenolysis reaction to produce additional stable intermediates; contacting at least a portion of the stably hydroxyl intermediates with a dehydrogenation catalyst to form a second reaction product stream; and contacting at least a portion of the second reaction product stream with a condensation catalyst comprising a base functionality to form a fuel blend. "Acidic" conditions or "acidic functionality" for the catalysts refer to either Bronsted or Lewis acid acidity. For Bronsted acidity, the catalyst is capable of donating protons (designed as $H^+$) to perform the catalytic reaction, under the conditions present in the catalytic reactor. Acidic ion exchange resins, phosphoric acid present as a liquid phase on a support, are two examples. Metal oxides such as silica, silica-aluminas, promoted zirconia or titania can provide protons $H^+$ associated with Bronsted acidiy in the presence of water or water vapor. Lewis acidity entails ability to accept an electron pair, and most typically is obtained via the presence of metal cations in a mixed metal-oxide framework such as silica-alumina or zeolite. Determination of acidic properties can be done via adsorption of a base such as ammonia, use of indictors, or via use of a probe reaction such as dehydration of an alcohol to an olefin, which is acid catalyzed. "Basic" conditions or "base functionality" for the catalysts can refer to either Bronsted or Lewis basicity. For Bronsted basicity, hydroxide anion is supplied by the catalyst, which may be present as an ion exchange resin, or supported liquid phase catalyst, mixed metal oxide with promoter such as alkali, calcium, or magnesium or in free solution. Lewis base catalysis refers to the conditions where Lewis base catalysis is the process by which an electron pair donor increases the rate of a given chemical reaction by interacting with an acceptor atom in one of the reagents or substrate (see Scott E. Denmark and Gregory L. Beutner, Lewis Base Catalysis in Organic Synthesis, Angew. Chem. Int. Ed. 2008, 47, 1560-1638). Presence and characterization of basic sites for a heterogeneous catalyst may be determined via sorption of an acidic component, use of probe reactions, or use of indicators. (see K. Tanabe, M. Misono, Y. Ono, H. Hattori (Eds.), New Solid Acids and Bases, Kodansha/Elsevier, Tokyo/Amsterdam, 1989, pp. 260-267). Catalysts such as mixed metal oxides may be "amphoteric", or capable of acting as acidic or basic catalysts depending on process conditions (pH, water concentration), or exhibit both acidic and basic properties under specific operating conditions, as a result of surface structures generated during formulation, or in situ during use to effect catalytic reactions.

In an embodiment, the aldol condensation reaction may be used to produce a fuel blend meeting the requirements for a diesel fuel or jet fuel. Traditional diesel fuels are petroleum distillates rich in paraffinic hydrocarbons. They have boiling ranges as broad as 190° C. to 420° C., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 can be defined as diesel fuel.

The present invention also provides methods to produce jet fuel. Jet fuel is clear to straw colored. The most common fuel is an unleaded/paraffin oil-based fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosene-type Airplane fuel (including Jet A and Jet A-1) has a carbon number distribution between about C8 and C16. Wide-cut or naphtha-type Airplane fuel (including Jet B) typically has a carbon number distribution between about C5 and C15. A fuel blend meeting ASTM D1655 can be defined as jet fuel.

In certain embodiments, both Airplanes (Jet A and Jet B) contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors, e.g., DCI-4A is used for civilian and military fuels and DCI-6A is used for military fuels. FSII agents, include, e.g., Di-EGME.

In an embodiment, a dehydrogenation reaction may be used in conjunction with an aldol condensation reaction to form higher hydrocarbons. The dehydrogenation reaction of the stable hydroxyl intermediates may produce a carbonyl-containing compound as an intermediate reactant for the aldol condensation reaction. The stable hydroxyl intermediates and/or a portion of the bio-based feedstock stream can be dehydrogenated in the presence of a catalyst.

In an embodiment, a dehydrogenation catalyst may be preferred for an stable hydroxyl intermediate stream comprising alcohols, and polyols. In general, alcohols and polyols cannot participate in aldol condensation directly. The hydroxyl group or groups present can be converted into carbonyls (e.g., aldehydes, ketones, etc.) in order to participate in an aldol condensation reaction. A dehydrogenation catalyst may be included to effect dehydrogenation of any alcohols, diols, or polyols present to form ketones and aldehydes. The dehydrogenation catalyst is typically formed from the same metals as used for hydrogenation, which catalysts are described in more detail above. Dehydrogenation yields are enhanced by the removal or consumption of hydrogen as it forms during the reaction. The dehydrogenation step may be carried out as a separate reaction step before an aldol condensation reaction, or the dehydrogenation reaction may be carried out in concert with the aldol condensation reaction. For concerted dehydrogenation and aldol condensation, the dehydrogenation and aldol condensation functions can be on the same catalyst. For example, a metal hydrogenation/dehydrogenation functionality may be present on catalyst comprising a basic functionality.

The dehydrogenation reaction may result in the production of a carbonyl-containing compound corresponding to the alcohol or polyol reactant. Suitable carbonyl-containing compounds may include, but are not limited to, any compound comprising a carbonyl functional group that can form carbanion species or can react in a condensation reaction with a carbanion species, where "carbonyl" is defined as a carbon atom doubly-bonded to oxygen. In an embodiment, a carbonyl-containing compound can include, but is not limited to, ketones, aldehydes, furfurals, hydroxy carboxylic acids, and, carboxylic acids. The ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, dihydroxyacetone, and isomers thereof. The aldehydes may include, without limitation, hydroxyaldehydes, acetaldehyde, glyceraldehyde, propionaldehyde, butyraldehyde, pentanal, hexanal, heptanal, octanal, nonal, decanal, undecanal, dodecanal, and isomers thereof. The carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Furfurals include, without limitation, hydroxylmethylfurfural, 5-hydroxymethyl-2(5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof.

In an embodiment, an acid catalyst may be used to optionally dehydrate at least a portion of the stable hydroxyl intermediate stream. Suitable acid catalysts for use in the dehydration reaction include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst can also include a modifier. Suitable modifiers include La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst can also include a metal. Suitable metals include Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in solution.

In some embodiments, the dehydration reaction occurs in the vapor phase. In other embodiments, the dehydration reaction occurs in the liquid phase. For liquid phase dehydration reactions, an aqueous solution may be used to carry out the reaction. In an embodiment, other solvents in addition to water, are used to form the aqueous solution. For example, water soluble organic solvents may be present. Suitable solvents can include, but are not limited to, hydroxymethylfurfural (HMF), dimethylsulfoxide (DMSO), 1-methyl-n-pyrollidone (NMP), and any combination thereof. Other suitable aprotic solvents may also be used alone or in combination with any of these solvents.

In an embodiment, the processing reactions may comprise an optional ketonization reaction. A ketonization reaction may increase the number of ketone functional groups within at least a portion of the oxygenated intermediate stream. For example, an alcohol or other hydroxyl functional group can be converted into a ketone in a ketonization reaction. Ketonization may be carried out in the presence of a base catalyst. Any of the base catalysts described above as the basic component of the aldol condensation reaction can be used to effect a ketonization reaction. Suitable reaction conditions are known to one of ordinary skill in the art and generally correspond to the reaction conditions listed above with respect to the aldol condensation reaction. The ketonization reaction may be carried out as a separate reaction step, or it may be carried out in concert with the aldol condensation reaction. The inclusion of a basic functional site on the aldol condensation catalyst may result in concerted ketonization and aldol condensation reactions.

In an embodiment, the processing reactions may comprise an optional ring opening reaction. A ring opening reaction may result in the conversion of at least a portion of any oxygenated intermediates comprising a ring into compounds that are more reactive in an aldol condensation reaction. A ring opening reaction may be carried out in the presence of an acidic catalyst. Any of the acid catalysts described above as the acid component of the aldol condensation reaction can be used to effect a ring opening reaction. Suitable reaction conditions are known to one of ordinary skill in the art and generally correspond to the reaction conditions listed above with respect to the aldol condensation reaction. The ring opening reaction may be carried out as a separate reaction step, or it may be carried out in concert with the aldol condensation reaction. The inclusion of an acid functional site on the aldol condensation catalyst may result in a concerted ring opening reaction and aldol condensation reactions. Such an embodiment may be advantageous as any rings can be opened in the presence of an acid functionality and reacted in an aldol condensation reaction using a base functionality. Such a concerted reaction scheme may allow for the production of a greater amount of higher hydrocarbons to be formed for a given oxygenated intermediate feed.

In an embodiment, production of a C4+ compound occurs by condensation, which may include aldol-condensation, of the stable hydroxyl intermediates in the presence of a condensation catalyst. Aldol-condensation generally involves the carbon-carbon coupling between two compounds, at least one of which may contain a carbonyl group, to form a larger organic molecule. For example, acetone may react with hydroxymethylfurfural to form a C9 species, which may subsequently react with another hydroxymethylfurfural molecule to form a C15 species. The reaction is usually carried out in the presence of a condensation catalyst. The condensation reaction may be carried out in the vapor or liquid phase. In an embodiment, the reaction may take place at a temperature in the range of from about 10° C. to about 380° C., depending on the reactivity of the carbonyl group formed during the dehydrogenation reaction.

The condensation catalyst will generally be a catalyst capable of forming longer chain compounds by linking two molecules through a new carbon-carbon bond, such as a basic catalyst, a multi-functional catalyst having both acid and base functionality, or either type of catalyst also comprising an optional metal functionality. In an embodiment, the multi-functional catalyst will be a catalyst having both a strong acid and a strong base functionality. In an embodiment, aldol catalysts can comprise Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In an embodiment, the base catalyst can also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In an embodiment, the condensation catalyst comprises a mixed-oxide base catalysts. Suitable mixed-oxide base catalysts can comprise a combination of magnesium, zirconium, and oxygen, which may comprise, without limitation: Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O or combinations thereof. Different atomic ratios of Mg/Zr or the combinations of various other elements constituting the mixed oxide catalyst may be used ranging from about 0.01 to about 50. In an embodiment, the condensation catalyst further includes a metal or alloys comprising metals, such as Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Such metals may be preferred when a dehydrogenation reaction is to be carried out in concert with the aldol condensation reaction. In an embodiment, preferred Group IA materials include Li, Na, K, Cs and Rb. In an embodiment, preferred Group IIA materials include Mg, Ca, Sr and Ba. In an embodiment, Group IIB materials include Zn and Cd. In an embodiment, Group IIIB materials include Y and La. Basic resins include resins that exhibit basic functionality. The base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In one embodiment, the condensation catalyst is derived from the combination of MgO and $Al_2O_3$ to form a hydrotalcite material. Another preferred material contains ZnO and $Al_2O_3$ in the form of a zinc aluminate spinel. Yet another preferred material is a combination of ZnO, $Al_2O_3$, and CuO. Each of these materials may also contain an additional metal function provided by a Group VIIIB metal, such as Pd or Pt. Such metals may be preferred when a dehydrogenation reaction is to be carried out in concert with the aldol condensation reaction. In one embodiment, the base catalyst is a metal oxide containing Cu, Ni, Zn, V, Zr, or mixtures thereof. In another embodiment, the base catalyst is a zinc aluminate metal containing Pt, Pd Cu, Ni, or mixtures thereof.

Preferred loading of the primary metal in the condensation catalyst is in the range of 0.10 wt % to 25 wt %, with weight percentages of 0.10% and 0.05% increments between, such as 1.00%, 1.10%, 1.15%, 2.00%, 2.50%, 5.00%, 10.00%, 12.50%, 15.00% and 20.00%. The preferred atomic ratio of the second metal, if any, is in the range of 0.25-to-1 to 10-to-1, including ratios there between, such as 0.50, 1.00, 2.50, 5.00, and 7.50-to-1.

In some embodiments, the base catalyzed condensation reaction is performed using a condensation catalyst with both an acid and base functionality. The acid-aldol condensation catalyst may comprise hydrotalcite, zinc-aluminate, phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the acid-base catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and combinations thereof. In an embodiment, the acid-base catalyst includes a metal functionality provided by Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. In one embodiment, the catalyst further includes Zn, Cd or phosphate. In one embodiment, the condensation catalyst is a metal oxide containing Pd, Pt, Cu or Ni, and even more preferably an aluminate or zirconium metal oxide containing Mg and Cu, Pt, Pd or Ni. The acid-base catalyst may also include a hydroxyapatite (HAP) combined with any one or more of the above metals. The acid-base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In an embodiment, the condensation catalyst may also include zeolites and other microporous supports that contain Group IA compounds, such as Li, Na, K, Cs and Rb. Preferably, the Group IA material is present in an amount less than that required to neutralize the acidic nature of the support. A metal function may also be provided by the addition of group VIIIB metals, or Cu, Ga, In, Zn or Sn. In one embodiment, the condensation catalyst is derived from the combination of MgO and $Al_2O_3$ to form a hydrotalcite material. Another preferred material contains a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

If a Group IIB, VIIB, VIIB, VIIIB, IIA or IVA metal is included in the condensation catalyst, the loading of the metal is in the range of 0.10 wt % to 10 wt %, with weight percentages of 0.10% and 0.05% increments between, such as 1.00%, 1.10%, 1.15%, 2.00%, 2.50%, 5.00% and 7.50%, etc. If a second metal is included, the preferred atomic ratio of the second metal is in the range of 0.25-to-1 to 5-to-1, including ratios there between, such as 0.50, 1.00, 2.50 and 5.00-to-1.

The condensation catalyst may be self-supporting (i.e., the catalyst does not need another material to serve as a support), or may require a separate support suitable for suspending the catalyst in the reactant stream. One exemplary support is silica, especially silica having a high surface area (greater than 100 square meters per gram), obtained by sol-gel synthesis, precipitation, or fuming. In other embodiments, particularly when the condensation catalyst is a powder, the catalyst system may include a binder to assist in forming the catalyst into a desirable catalyst shape. Applicable forming processes include extrusion, pelletization, oil dropping, or other known processes. Zinc oxide, alumina, and a peptizing agent may also be mixed together and extruded to produce a formed material. After drying, this material is calcined at a temperature appropriate for formation of the catalytically active phase, which usually requires temperatures in excess of 450° C. Other catalyst supports as known to those of ordinary skill in the art may also be used.

In some embodiments, the dehydrogenation catalyst and the condensation catalyst can be present in the same reactor as the reaction conditions overlap to some degree. In these embodiments, the dehydrogenation reaction may occur substantially simultaneously with the condensation reaction. In some embodiments, a catalyst may comprise active sites for both a dehydrogenation reaction and a condensation reaction. For example, a catalyst may comprise active metals for a dehydrogenation reaction and a condensation reaction at separate sites on the catalyst or as alloys. Suitable active elements can comprise any of those listed above with respect to the dehydrogenation catalyst and the condensation catalyst. Alternately, a physical mixture of dehydrogenation and condensation catalysts could be employed. While not intending to be limited by theory, it is believed that using a condensation catalyst comprising a metal and/or an acid functionality may assist in pushing the equilibrium limited aldol condensation reaction towards completion. Advantageously, this can be used to effect multiple condensation reactions with dehydrogenation of intermediates, in order to form (via condensation and dehydration) higher molecular weight oligomers as desired to produce jet or diesel fuel.

The specific C4+ compounds produced in the condensation reaction will depend on various factors, including, without limitation, the type of stable hydroxyl intermediates in the reactant stream, condensation temperature, the catalyst or catalyst combinations used, condensation pressure, the reactivity of the catalyst, and the flow rate of the reactant stream as it affects the space velocity, GHSV and WHSV. Preferably, the reactant stream is contacted with the condensation catalyst at a WHSV that is appropriate to produce the desired hydrocarbon products. The WHSV is preferably at least about 0.1 grams of stable hydroxyl intermediates in the reactant stream per hour, more preferably the WHSV is between about 0.1 to 40.0 g/g hr, including a WHSV of about 1, 2, 3, 4, 5, 6, 7, 8, 9, 10, 11, 12, 13, 14, 15, 20, 25, 30, 35 g/g hr, and increments between.

In general, the condensation reaction should be carried out at a temperature at which the thermodynamics of the proposed reaction are favorable. For condensed phase liquid reactions, the pressure within the reactor must be sufficient to maintain at least a portion of the reactants in the condensed liquid phase at the reactor inlet. For vapor phase reactions, the reaction should be carried out at a temperature where the vapor pressure of the stable hydroxyl intermediates is at least about 10 kPa, and the thermodynamics of the reaction are favorable. The condensation temperature will vary depending upon the specific stable hydroxyl intermediates used, but is generally in the range of from about 80° C. to 500° C. for reactions taking place in the vapor phase, and more preferably from about 125° C. to 450° C. For liquid phase reactions, the condensation temperature may be from about 10° C. to 480° C., and the condensation pressure from about 0.1 kPa to 10,000 kPa. Preferably, the condensation temperature is between about 20° C. and 300° C., or between about 20° C. and 250° C. for difficult substrates.

Varying the factors above, as well as others, will generally result in a modification to the specific composition and yields of the C4+ compounds. For example, varying the temperature and/or pressure of the reactor system, or the particular catalyst formulations, may result in the production of C4+ alcohols and/or ketones instead of C4+ hydrocarbons. The C4+ hydrocarbon product may also contain a variety of olefins, and alkanes of various sizes (typically branched alkanes). Depending upon the condensation catalyst used, the hydrocarbon product may also include aromatic and cyclic hydrocarbon compounds. The C4+ hydrocarbon product may also contain undesirably high levels of olefins, which may lead to coking or deposits in combustion engines, or other undesirable hydrocarbon products. In such event, the hydrocarbon molecules produced may be optionally hydrogenated to reduce the ketones to alcohols and hydrocarbons, while the alcohols and unsaturated hydrocarbon may be reduced to alkanes, thereby forming a more desirable hydrocarbon product having low levels of olefins, aromatics or alcohols.

The condensation reactions may be carried out in any reactor of suitable design, including continuous-flow, batch, semi-batch or multi-system reactors, without limitation as to design, size, geometry, flow rates, etc. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reactions.

In a continuous flow system, the reactor system can include a dehydrogenation bed adapted to produce a dehydrogenated stable hydroxyl intermediates, and a condensation bed to produce C4+ compounds from the stable hydroxyl intermediates. The dehydrogenation bed is configured to receive the reactant stream and produce the desired stable hydroxyl intermediates. The condensation bed is configured to receive the stable hydroxyl intermediate for contact with the condensation catalyst and production of the desired C4+ compounds. For systems with one or more finishing steps, an additional reaction bed or beds for conducting the finishing process or processes may be included after the condensation bed.

In an embodiment, the dehydrogenation reaction, the optional dehydration reaction, the optional ketonization reaction, the optional ring opening reaction, and the condensation reaction catalyst beds may be positioned within the same reactor vessel or in separate reactor vessels in fluid communication with each other. Each reactor vessel preferably includes an outlet adapted to remove the product stream from the reactor vessel. For systems with one or more finishing steps, the finishing reaction bed or beds may be within the same reactor vessel along with the condensation bed or in a separate reactor vessel in fluid communication with the reactor vessel having the condensation bed.

In an embodiment, the reactor system also includes additional outlets to allow for the removal of portions of the reactant stream to further advance or direct the reaction to the desired reaction products, and to allow for the collection and recycling of reaction by-products for use in other portions of the system. In an embodiment, the reactor system also includes additional inlets to allow for the introduction of supplemental materials to further advance or direct the reaction to the desired reaction products, and to allow for the recycling of reaction by-products for use in other reactions.

In an embodiment, the reactor system also includes elements which allow for the separation of the reactant stream into different components which may find use in different reaction schemes or to simply promote the desired reactions. For instance, a separator unit, such as a phase separator, extractor, purifier or distillation column, may be installed prior to the condensation step to remove water from the reactant stream for purposes of advancing the condensation reaction to favor the production of higher hydrocarbons. In an embodiment, a separation unit is installed to remove specific intermediates to allow for the production of a desired product stream containing hydrocarbons within a particular carbon number range, or for use as end products or in other systems or processes.

The condensation reaction can produce a broad range of compounds with carbon numbers ranging from C4 to C30 or greater. Exemplary compounds include, but are not limited to, C4+ alkanes, C4+ alkenes, C5+ cycloalkanes, C5+ cycloalkenes, aryls, fused aryls, C4+ alcohols, C4+ ketones, and mixtures thereof. The C4+ alkanes and C4+ alkenes may range from 4 to 30 carbon atoms (C4-C30 alkanes and C4-C30 alkenes) and may be branched or straight chained alkanes or alkenes. The C4+ alkanes and C4+ alkenes may also include fractions of C7-C14, C12-C24 alkanes and alkenes, respectively, with the C7-C14 fraction directed to jet fuel blend, and the C12-C24 fraction directed to a diesel fuel blend and other industrial applications. Examples of various C4+ alkanes and C4+ alkenes include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The C5+ cycloalkanes and C5+ cycloalkenes have from 5 to 30 carbon atoms and may be unsubstituted, mono-substituted or multi-substituted. In the case of mono-substituted and multi-substituted compounds, the substituted group may include a branched C3+ alkyl, a straight chain C1+ alkyl, a branched C3+ alkylene, a straight chain C1+ alkylene, a straight chain C2+ alkylene, a phenyl or a combination thereof. In one embodiment, at least one of the substituted groups include a branched C3-C12 alkyl, a straight chain C1-C12 alkyl, a branched C3-C12 alkylene, a straight chain C1-C12 alkylene, a straight chain C2-C12 alkylene, a phenyl or a combination thereof. In yet another embodiment, at least one of the substituted groups includes a branched C3-C4 alkyl, a straight chain C1-C4 alkyl, a branched C3-C4 alkylene, a straight chain C1-C4 alkylene, a straight chain C2-C4 alkylene, a phenyl, or any combination thereof. Examples of desirable C5+ cycloalkanes and C5+ cycloalkenes include, without limitation, cyclopentane, cyclopentene, cyclohexane, cyclohexene, methyl-cyclopentane, methyl-cyclopentene, ethyl-cyclopentane, ethyl-cyclopentene, ethyl-cyclohexane, ethyl-cyclohexene, and isomers thereof.

Aryls will generally consist of an aromatic hydrocarbon in either an unsubstituted (phenyl), mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In one embodiment, at least one of the substituted groups includes a branched C3-C12 alkyl, a straight chain C1-C12 alkyl, a branched C3-C12 alkylene, a straight chain C2-C12 alkylene, a phenyl, or any combination thereof. In yet another embodiment, at least one of the substituted groups includes a branched C3-C4 alkyl, a straight chain C1-C4 alkyl, a branched C3-C4 alkylene, straight chain C2-C4 alkylene, a phenyl, or any combination thereof. Examples of various aryls include, without limitation, benzene, toluene, xylene (dimethylbenzene), ethyl benzene, para xylene, meta xylene, ortho xylene, C9 aromatics.

Fused aryls will generally consist of bicyclic and polycyclic aromatic hydrocarbons, in either an unsubstituted, mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In another embodiment, at least one of the substituted groups includes a branched C3-C4 alkyl, a straight chain C1-C4 alkyl, a branched C3-C4 alkylene, a straight chain C2-C4 alkylene, a phenyl, or any combination thereof. Examples of various fused aryls include, without limitation, naphthalene, anthracene, tetrahydronaphthalene, and decahydronaphthalene, indane, indene, and isomers thereof.

The moderate fractions, such as C7-C14, may be separated for jet fuel, while heavier fractions, (e.g., C12-C24), may be separated for diesel use. The heaviest fractions may be used as lubricants or cracked to produce additional gasoline and/or diesel fractions. The C4+ compounds may also find use as industrial chemicals, whether as an intermediate or an end product. For example, the aryls toluene, xylene, ethyl benzene, para xylene, meta xylene, ortho xylene may find use as chemical intermediates for the production of plastics and other products. Meanwhile, the C9 aromatics and fused aryls, such as naphthalene, anthracene, tetrahydronaphthalene, and decahydronaphthalene, may find use as solvents in industrial processes.

In an embodiment, additional processes are used to treat the fuel blend to remove certain components or further conform the fuel blend to a diesel or jet fuel standard. Suitable techniques include hydrotreating to reduce the amount of or remove any remaining oxygen, sulfur, or nitrogen in the fuel blend. The conditions for hydrotreating a hydrocarbon stream are known to one of ordinary skill in the art.

In an embodiment, hydrogenation is carried out in place of or after the hydrotreating process to saturate at least some olefinic bonds. In some embodiments, a hydrogenation reaction may be carried out in concert with the aldol condensation reaction by including a metal functional group with the aldol condensation catalyst. Such hydrogenation may be performed to conform the fuel blend to a specific fuel standard (e.g., a diesel fuel standard or a jet fuel standard). The hydrogenation of the fuel blend stream can be carried out according to known procedures, either with the continuous or batch method. The hydrogenation reaction may be used to remove a remaining carbonyl group or hydroxyl group. In such event, any one of the hydrogenation catalysts described above may be used. Such catalysts may include any one or more of the following metals, Cu, Ni, Fe, Co, Ru, Pd, Rh, Pt, Ir, Os, alloys or combinations thereof, alone or with promoters such as Au, Ag, Cr, Zn, Mn, Sn, Cu, Bi, and alloys thereof, may be used in various loadings ranging from about 0.01 wt % to about 20 wt % on a support as described above. In general, the finishing step is carried out at finishing temperatures of between about 80° C. to 250° C., and finishing pressures in the range of about 700 kPa to 15,000 kPa. In one embodiment, the finishing step is conducted in the vapor phase or liquid phase, and uses in situ generated $H_2$ (e.g., generated in the APR reaction step), external $H_2$, recycled $H_2$, or combinations thereof, as necessary.

In an embodiment, isomerization is used to treat the fuel blend to introduce a desired degree of branching or other shape selectivity to at least some components in the fuel blend. It may be useful to remove any impurities before the hydrocarbons are contacted with the isomerization catalyst. The isomerization step comprises an optional stripping step, wherein the fuel blend from the oligomerization reaction may be purified by stripping with water vapor or a suitable gas such as light hydrocarbon, nitrogen or hydrogen. The optional stripping step is carried out in counter-current manner in a unit upstream of the isomerization catalyst, wherein the gas and liquid are contacted with each other, or before the actual isomerization reactor in a separate stripping unit utilizing counter-current principle.

After the optional stripping step the fuel blend can be passed to a reactive isomerization unit comprising one or several catalyst bed(s). The catalyst beds of the isomerization step may operate either in co-current or counter-current manner. In the isomerization step, the pressure may vary from 2000 kPa to 15,000 kPa, preferably in the range of 2000 kPa to 10,000 kPa, the temperature being between 200° C. and 500° C., preferably between 300° C. and 400° C. In the isomerization step, any isomerization catalysts known in the art may be used. Suitable isomerization catalysts can contain molecular sieve and/or a metal from Group VII and/or a carrier. In an embodiment, the isomerization catalyst contains SAPO-11 or SAPO41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

Other factors, such as the concentration of water or undesired stable hydroxyl intermediates, may also effect the composition and yields of the C4+ compounds, as well as the activity and stability of the condensation catalyst. In such event, the process may include a dewatering step that removes a portion of the water prior to the condensation reaction and/or the optional dehydration reaction, or a separation unit for removal of the undesired stable hydroxyl intermediates. For instance, a separator unit, such as a phase separator, extractor, purifier or distillation column, may be installed prior to the condensation step so as to remove a portion of the water from the reactant stream containing the stable hydroxyl intermediates. A separation unit may also be installed to remove specific oxygenated intermediates to allow for the production of a desired product stream containing hydrocarbons within a particular carbon range, or for use as end products or in other systems or processes.

Thus, in one embodiment, the fuel blend produced by the processes described herein is a hydrocarbon mixture that meets the requirements for jet fuel (e.g., conforms with ASTM D1655). In another embodiment, the product of the processes described herein is a hydrocarbon mixture that comprises a fuel blend meeting the requirements for a diesel fuel (e.g., conforms with ASTM D975).

In an embodiment of the present invention, the fuel yield of the current process may be greater than other bio-based feedstock conversion processes. Without wishing to be limited by theory, it is believed that the use of a multi-temperature hydrolysis reaction process along with the direct APR of the extracted compounds allows for a greater percentage of the bio-based feedstock to be converted into higher hydrocarbons while limiting the formation of degradation products.

To facilitate a better understanding of the present invention, the following examples of certain aspects of some embodiments are given. In no way should the following examples be read to limit, or define, the entire scope of the invention.

EXAMPLES

Examples 1-14

Batch Hydrogenolysis and Aqueous Phase Reforming

In treating an aqueous mixture of carbohydrates, the carbohydrates can be "reformed" under appropriate conditions to produce hydrogen, as illustrated by formation of isopropanol (i.e., IPA, or 2-propanol) from sorbitol in Eq. 1 shown above. Alternately, in the presence of hydrogen, polyols and mono-oxygenates such as IPA can be formed by hydrogenolysis, where hydrogen is consumed rather than produced, as shown in Eqs. 2 and 3 above.

For hydrogenolysis pathways where a source of hydrogen is available (e.g., refinery offgas, or direct $H_2$ production via renewable or non-fossil energy), the yields of biofuels may be increased via avoidance of loss of bio-based carbon as $CO_2$. The current process provides optimized conditions to produce polyols such as propylene glycol (PG) via Eq. 2 rather than produce yield loss to $CO_2$ via "reforming" reaction in Eq. 1 for those cases where a $H_2$ source is available or can be economically provided. This may include production of $H_2$ from solar or nuclear energy with capture and storage of $CO_2$ at a centralized location, and use of that hydrogen to increase the yields of biofuels via the reactions shown in Eq. 2 and Eq. 3.

To test this concept, a series of reactions were conducted in 100-ml stirred reactors with draft-tube gas-induction impellers (Parr Series 4590). The reactors were filled with 60-grams of liquid comprising 15, 30, or 50 weight percent (wt %) sorbitol in deionized-water. Sorbitol is the sugar alcohol formed from hydrogenation of glucose, or combined hydrolysis and hydrogenation of sucrose, and is representative of a bio-based feedstock intermediate which can be readily formed from sugar cane, corn starch, or from hydrolysis of biomass. The reactor was charged with one gram of a hydrogenolysis or reforming catalyst, comprising a Group VIII metal on support. A batch reaction time of 20 hours under these conditions corresponds to a weight hourly space velocity (g-feed/g-catalyst/h) of about 3, for a comparable continuous flow reactor. A 0.5-micron sintered metal filter attached to a dip tube allowed liquid samples to be taken throughout the course of reaction. For examples #1-12, the reactor was pre-filled with $H_2$ to obtain a nominal pressure of 6000 kPa after heat up to reaction conditions. For examples #13 and #14, nitrogen was added at 3000 kPa prior to start up.

Samples were analyzed by an HPLC method based on combined size and ion exclusion chromatography, to determine unreacted sorbitol, and amount of C3 and smaller polyols formed: glycerol (Gly), ethylene glycol (EG), and 1,2-propylene glycol (PG). Additional GC analyses via a moderate polarity DB-5 column were conducted to assess formation of C6 and lighter oxygenated intermediates (ketones, aldehydes, alcohols). A separate GC equipped with thermal conductivity and flame ionization (FID) detectors for refinery gas analysis, were used for detection of $H_2$, $CO_2$, and light alkanes C1-C5.

Results of hydrogenolysis experiments conducted at 210° C. to 220° C. are shown in Table 1. Comparative aqueous phase reforming (APR) experiments under $N_2$ at 245° C. to 260° C. are given in Table 2. For these tables, "polyols total wt %" is the sum of unreacted sorbitol, plus EG, PG, and glycerol. EG, PG, and Glycerol selectivity is defined as the weight percent of these species formed, divided by the weight percent of sorbitol reacted. For Example 13, a 2.6% molar yield of net $N_2$ production was observed, corresponding to a final $H_2$ atmosphere of 110 kPa. A similar $H_2$ atmosphere was present at the end of the example 14 experiment (109 kPa), from reforming of sorbitol. In addition to polyols, an array of C1-C6 ketones, alcohols, and carboxylic acids were also detected by GCMS (mass spec) analysis of APR and hydrogenolysis products (Table 3).

As would be known to one of ordinary skill in the art, examples 13 & 14 show that at high temperature 260° C., few polyols remain in the APR reaction mixture. As temperature is decreased from 260° C. to 240° C. under APR conditions, the selectivity to C2-C3 polyols (EG, PG, Glycerol) is increased, but remains at less than 10% over the supported platinum catalyst. A further reduction in temperature to 210° C. to 220° C. and use of non-noble nickel, ruthenium, and cobalt catalysts leads to increased selectivity (25-70%) to the C2-C3 polyol "hydrogenolysis" products (Examples 1-12). Selectivity to hydrogenolysis or polyol products is increased (Example 12) where a dilute 15% sorbitol in water solution is fed to the reactor, relative to standard reaction conditions of 50 wt % sorbitol. Without intending to be limited by theory, it is believed that this can be explained by sorbitol degradation occurring at reaction orders greater than one, such that higher concentrations lead to nonselective by-products. The selectivity to the C2-C3 hydrogenolysis polyols decreased with time, as sorbitol conversion increased, which also is indicative of additional reaction of polyol intermediates. However, it was possible to obtain greater than 90% conversion of sorbitol, while maintaining at least a 25% selectivity to the C2-C3 hydrogenolysis polyols EG, PG, and glycerol.

TABLE 1

Batch Hydrogenolysis Experiments

| Ex# | Catalyst | Gas | Temp [K] | Final pH | Time hours | Sorbitol wt % | Glycerol wt % | EG wt% | PG wt % | polyols total wt % | EG + PG + Gly selectivity |
|---|---|---|---|---|---|---|---|---|---|---|---|
| 1 | Ni/SiO2-1 | H2 | 493 | 3.85 | 0.00 | 50.00 | 0.00 | 0.00 | 0.00 | 50.00 | N/A |
|   |   |   |   |   | 1.00 | 27.48 | 9.58 | 2.32 | 3.43 | 42.81 | 68.1% |
|   |   |   |   |   | 3.20 | 16.48 | 8.37 | 3.43 | 7.56 | 35.84 | 57.7% |
|   |   |   |   |   | 7.40 | 3.22 | 4.45 | 3.24 | 14.98 | 25.89 | 48.5% |
|   |   |   |   |   | 18.10 | 0.04 | 0.51 | 1.74 | 15.64 | 17.93 | 35.8% |
| 2 | 5% Ru/C | H2 | 483 | 3.71 | 0.00 | 50.00 | 0.00 | 0.00 | 0.00 | 50.00 | N/A |
|   |   |   |   |   | 1.00 | 37.67 | 4.80 | 1.20 | 1.50 | 45.17 | 60.8% |
|   |   |   |   |   | 3.30 | 27.47 | 7.68 | 2.42 | 4.44 | 42.01 | 64.6% |
|   |   |   |   |   | 7.40 | 24.76 | 6.86 | 2.62 | 5.45 | 39.69 | 59.2% |
|   |   |   |   |   | 19.00 | 19.48 | 5.17 | 2.13 | 5.58 | 32.36 | 42.2% |
|   |   |   |   |   | 19.10 | 16.88 | 4.47 | 1.83 | 5.08 | 28.26 | 34.4% |
| 3 | 5% Ru/C | H2 | 493 | 3.95 | 0.00 | 50.00 | 0.00 | 0.00 | 0.00 | 50.00 | N/A |
|   |   |   |   |   | 1.00 | 33.42 | 5.37 | 2.01 | 3.02 | 43.82 | 62.7% |
|   |   |   |   |   | 2.80 | 27.29 | 5.35 | 2.68 | 4.46 | 39.77 | 55.0% |
|   |   |   |   |   | 5.90 | 24.42 | 4.66 | 2.62 | 4.95 | 36.66 | 47.8% |
|   |   |   |   |   | 19.00 | 15.65 | 3.01 | 1.81 | 5.12 | 25.59 | 28.9% |
| 4 | Ni/SiO2-1 | H2 | 483 | 3.78 | 0.00 | 50.00 | 0.00 | 0.00 | 0.00 | 50.00 | N/A |
|   |   |   |   |   | 1.05 | 33.21 | 7.65 | 1.79 | 1.28 | 43.92 | 63.8% |
|   |   |   |   |   | 3.08 | 19.61 | 12.19 | 3.05 | 4.57 | 39.42 | 65.2% |
|   |   |   |   |   | 8.22 | 8.24 | 8.91 | 3.96 | 10.64 | 31.74 | 56.3% |
|   |   |   |   |   | 20.10 | 0.24 | 2.61 | 3.09 | 17.10 | 23.04 | 45.8% |
| 5 | Raney Co | H2 | 483 | 3.8 | 0.00 | 50.00 | 0.00 | 0.00 | 0.00 | 50.00 | N/A |
|   |   |   |   |   | 1.00 | 40.14 | 2.01 | 0.75 | 1.26 | 44.16 | 40.8% |
|   |   |   |   |   | 2.90 | 34.77 | 2.99 | 1.24 | 2.49 | 41.49 | 44.1% |
|   |   |   |   |   | 7.50 | 27.38 | 3.27 | 1.51 | 4.02 | 36.18 | 38.9% |
|   |   |   |   |   | 25.00 | 19.63 | 2.75 | 1.50 | 5.25 | 29.13 | 31.3% |
| 6 | 5% Ru/C | H2 | 483 | 3.68 | 0.00 | 50.00 | 0.00 | 0.00 | 0.00 | 50.00 | N/A |
|   |   |   |   |   | 1.00 | 39.16 | 3.76 | 0.75 | 0.75 | 44.43 | 48.6% |
|   |   |   |   |   | 3.50 | 30.42 | 5.94 | 1.48 | 2.47 | 40.31 | 50.5% |
|   |   |   |   |   | 7.33 | 27.81 | 5.63 | 1.88 | 3.29 | 38.60 | 48.6% |
|   |   |   |   |   | 22.50 | 21.02 | 4.12 | 1.60 | 3.66 | 30.40 | 32.4% |
| 7 | Ni/SiO2-1 | H2 | 483 | 3.96 | 0.00 | 50.00 | 0.00 | 0.00 | 0.00 | 50.00 | N/A |
|   |   |   |   |   | 1.00 | 34.41 | 5.74 | 1.57 | 0.78 | 42.50 | 51.9% |
|   |   |   |   |   | 2.70 | 19.97 | 9.93 | 2.98 | 4.97 | 37.85 | 59.5% |
|   |   |   |   |   | 7.70 | 11.09 | 8.03 | 3.89 | 10.36 | 33.37 | 57.3% |
|   |   |   |   |   | 18.70 | 0.05 | 0.75 | 2.50 | 17.99 | 21.29 | 42.5% |

TABLE 1-continued

Batch Hydrogenolysis Experiments

| Ex# | Catalyst | Gas | Temp [K] | Final pH | Time hours | Sorbitol wt % | Glycerol wt % | EG wt% | PG wt % | polyols total wt % | EG + PG + Gly selectivity |
|---|---|---|---|---|---|---|---|---|---|---|---|
| 8 | Ni/SiO2-1 | H2 | 483 | 4.82 | 0.00 | 50.00 | 0.00 | 0.00 | 0.00 | 50.00 | N/A |
|  |  |  |  |  | 0.00 | 48.04 | 0.00 | 0.00 | 0.00 | 48.04 | 0.0% |
|  |  |  |  |  | 2.50 | 23.69 | 7.48 | 2.99 | 5.49 | 39.66 | 60.7% |
|  |  |  |  |  | 7.70 | 12.50 | 6.71 | 3.73 | 9.94 | 32.88 | 54.4% |
|  |  |  |  |  | 22.80 | 2.14 | 3.24 | 3.49 | 15.95 | 24.82 | 47.4% |
| 9 | Ni5249P | H2 | 493 | 5.31 | 0.00 | 50.00 | 0.00 | 0.00 | 0.00 | 50.00 | N/A |
|  |  |  |  |  | 2.05 | 33.11 | 1.18 | 2.16 | 5.51 | 41.97 | 52.4% |
|  |  |  |  |  | 7.10 | 16.85 | 1.39 | 3.98 | 10.93 | 33.15 | 49.2% |
|  |  |  |  |  | 23.60 | 0.79 | 0.58 | 3.84 | 17.29 | 22.50 | 44.1% |
| 10 | 5% Ru/C | H2 | 483 | 4.1 | 0.00 | 50.00 | 0.00 | 0.00 | 0.00 | 50.00 | N/A |
|  |  |  |  |  | 1.25 | 37.17 | 1.00 | 1.39 | 2.99 | 42.55 | 41.9% |
|  |  |  |  |  | 5.92 | 28.60 | 2.39 | 2.59 | 6.98 | 40.56 | 55.9% |
|  |  |  |  |  | 19.60 | 17.09 | 2.71 | 3.70 | 11.54 | 35.04 | 54.5% |
| 11 | Ni/SiO2-1 | H2 | 483 | 7.56 | 0.00 | 50.00 | 0.00 | 0.00 | 0.00 | 50.00 | N/A |
|  |  |  |  |  | 2.00 | 30.13 | 0.92 | 1.93 | 4.58 | 37.56 | 37.4% |
|  |  |  |  |  | 6.75 | 13.21 | 0.61 | 3.65 | 9.52 | 26.99 | 37.4% |
|  |  |  |  |  | 25.00 | 0.72 | 0.00 | 2.94 | 12.26 | 15.92 | 30.8% |
| 12 | Ni/SiO2-2 | H2 | 488 | N/A | 0 | 15.00 | 0.00 | 0.00 | 0.00 | 15.00 | N/A |
|  |  |  |  |  | 1.5 | 4.00 | 1.37 | 1.25 | 4.60 | 11.22 | 65.6% |
|  |  |  |  |  | 3 | 1.09 | 1.82 | 2.09 | 5.27 | 10.27 | 66.0% |
|  |  |  |  |  | 5.5 | 0.11 | 2.15 | 3.04 | 4.79 | 10.09 | 67.0% |

Ni/SiO$_2$-1 = 64% Nickel;
Ni/SiO$_2$-2 = 53-58 wt % Ni.

TABLE 2

Batch APR Experiments

| Ex# | Catalyst | Gas | Temp [deg C.] | Final pH | Time hours | Sorbitol wt % | Glycerol wt % | EG wt % | PG wt % | polyols total wt % | EG + PG + Gly selectivity |
|---|---|---|---|---|---|---|---|---|---|---|---|
| 13 | Re/Pt/ZrO$_2$ | N2 | 533 | 3.6 | 0.00 | 30.00 | 0.00 | 0.00 | 0.00 | 30.00 | N/A |
|  |  |  |  |  | 1.00 | 27.23 | 0.00 | 0.00 | 0.00 | 27.23 | 0.0% |
|  |  |  |  |  | 3.00 | 10.84 | 0.00 | 0.00 | 0.20 | 11.04 | 1.1% |
|  |  |  |  |  | 5.50 | 1.57 | 0.00 | 0.10 | 0.20 | 1.87 | 1.1% |
| 14 | Re/Pt/ZrO$_2$ | N2 | 518 | N/A | 0.00 | 15.00 | 0.00 | 0.00 | 0.00 | 15.00 | N/A |
|  |  |  |  |  | 20 | 0.67 | 1.04 | 0.00 | 0.23 | 1.94 | 8.9% |

1.9% Pt, 7.1% Re on zirconia

Example 15

Direct Hydrogenolysis of Biomass

For example #15, 3.59 grams of sugar cane bagasse solids (5% moisture) were added directly to the batch reactor with 60.1 grams of deionized water, to demonstrate concerted hydrolysis of biomass with hydrogenolysis of the resulting hydrolysate. 0.924 grams of Ni/SiO$_2$-1 catalyst were used in a reaction conducted with the addition of 3500 kPa of H$_2$ (at room temperature). Temperatures were staged for 2.5 hours at 170° C., 2.5 hours at 190° C., and 17 hours at 210° C., to allow the more readily hydrolysable C5 sugars to be extracted and hydrotreated at a lower temperature, to avoid degradation to heavy ends. The sequence was repeated for two additional cycles after addition of 3.62 grams and 3.58 grams of additional bagasse. GC analysis showed production of hydrogenolysis products ethylene glycol, propylene glycol, and glycerol at 10% of total yield, along with 5 wt % acetic acid as byproduct. Total measured yield was 55% of the injected biomass.

Example 16

Bagasse Hydrogenolysis

Experiment 15 was repeated with 0.96 grams of Ni/silica catalyst, and bagasse additions of 3.52, 3.53, and 3.61 grams for successive cycles. Temperatures were immediately ramped to 210° C., after an initial charge of 3500 kPa of hydrogen. GC analysis indicated a yield of more than 12% to ethylene glycol, 1,2-propylene glycol, and glycerol products, with conversion and solubilization of 60% of the bagasse charged to measurable products.

Example 17

Bagasse Hydrogenolysis with Ethylene Glycol as Co-Solvent

A 100-ml batch reactor was charged with 3.50 grams of bagasse, 6.05 grams of ethylene glycol, 1.02 grams of acetic acid, and 54.06 grams of deionized water. Hydrogen was added at 4200 kPa, before heating to 160° C. for 2 hours, then 190° C. for 2 hours, and finally 210° C. for a total of 15.6 hours. Gas chromatographic analysis showed formation of 1,2-propylene glycol and glycerol in low yields. Greater than 96% of the solids were digested by the solvent. This experiment demonstrates the use of the hydrogenolysis product ethylene glycol and co-product acetic acid to enhance the solubilization of bagasse during hydrogenolysis.

Example 18

Preparation of Solid Base Catalysts

Basic copper-magnesium-cerium oxide catalyst were prepared by co-precipitation of metal nitrate solutions via KOH and potassium carbonate, as described by M. Gines and E. Iglesia [J. Catalysis 1998, 176 (155-172)].

A magnesia-zirconia (MgO—$ZrO_2$) catalyst was synthesized using the sol-gel technique starting with magnesium nitrate {$Mg(NO_3)_2.6H_2O$} and zirconyl nitrate {$ZrO(NO_3)_2$}. The catalyst was prepared by dissolving 50.9 g of magnesium nitrate and 4.04 g of zirconyl nitrate in 1 liter of deionized (DI) water. The mixture was stirred at room temperature, and NaOH (25 wt %) solution was added until the pH was equal to 10. The gel was aged for 72 h and subsequently vacuum filtered. The precipitate formed was washed with DI water until the Na ion concentration in the filtrate was below 10 ppm, as measured by Inductively Coupled Plasma (ICP) analysis [Perkin Elmer Plasma 400 ICP Emission Spectrometer]. It was then dried in an oven at 120° C. from 16 to 24 h. Calcination of the catalyst was carried out in $O_2$ (~100 $cm^3$(NTP)min-1) with a 3 h ramp and a 3 h hold to 600° C.

For some experiments, Pd was added to give a 1 wt % Pd/MgO—$ZrO_2$ catalyst, using incipient wetness impregnation of a solution of 5 wt % Pd in tetraaminepalladium (II) nitrate solution. Mixed Mg—Al-oxide hydrotalcite catalysts of variable Mg/Al atomic ratio of 2 was prepared by adding $Mg(NO_3).26H_2O$ and $Al(NO_3).39H_2O$ (0.093 mol) to $H_2O$. A second solution containing NaOH (4 parts) and $Na_2CO_3$ (1 part) in excess $H_2O$ was slowly added to the Mg/Al aqueous solution with constant stirring over a period of 3 h. The pH of the solution was maintained at 11.0 by adding additional NaOH solution (25 wt %) when required. This solution was then heated to 65° C. for 18 h. A precipitate formed, which was subsequently filtered and washed with de-ionized water until the sodium (Na) content of the filtrate was below 10 ppm as measured by ICP analysis. The precipitate was dried in an oven at 80° C. for 12 h to obtain the hydrotalcite. Calcination of the hydrotalcite was carried out in flowing $O_2$ (GHSV 400 h/1), during which the temperature was ramped from room temperature to 450° C. over 2 h and then held at 450° C. for 8 h. The mixed Mg—Al-oxide catalyst thus prepared was used to carry out aldol-condensation reactions.

Example 19

Flow Reaction with Hydrogenolysis Model Feed and Base Condensation and Dehydrogenation Catalyst A flow reactor was packed with 1.217 grams of a CuMg-$CeO_2$ dehydrogenation/condensation and 0.602 grams of a Mg/$ZrO_2$ base condensation catalyst. An aqueous mixture of 30% by weight 1,2-propane diol (propylene glycol), 10% ethylene glycol, and 10% glycerol was introduced at a flowrate of 1.2 grams/per hour, corresponding to a weight hourly space velocity of 0.66/hour, and a backpressure of 1000 kPa of nitrogen. Gas chromatographic analysis was conducted via dual 60-m DB-5 (5% diphenyl-dimethylpolysiloxane) and DB-1701 (14% cyanopropylphenyl-methylpolysilozane) columns. Normal-alkane standards were again injected to characterize retention times. Products formed via reaction were characterized by retention times for the corresponding ranges of alkane standards.

At a reaction temperature of 400° C. and a pressure of 1000 kPa of nitrogen, an upper oil layer formed as 9.3% of total liquid products. Conversion of feed to products was estimated as 60.1%. Retention times of observed products in the lower aqueous layer relative to normal alkanes are shown in Table 3. Formation of products of lower volatility and longer retention times relative to the starting polyol mixture was evident from the aqueous phase GC analysis, while formation of an oil layer indicates condensation to non-water soluble component suitable for use as a liquid fuel.

TABLE 3

Aqueous phase analysis from flow reaction with base catalyst and model hydrogenolysis product as feed

| | |
|---|---|
| 27.3% | <C6 |
| 38.4% | C6-C9 |
| 024.6% | C9-C12 |
| 9.0% | C12-C15 |
| 0.7% | C15+ |

Example 20

50% Glycerol Feed to Dehydrogenation/Base Condensation Catalyst

The feed to the flow reactor of Example 19 was changed to 50% glycerol in deionized water, under otherwise identical conditions 400° C., 1000 kPa nitrogen backpressure, WHSV=0.66). An upper layer oil phase corresponding to 16.4% of the total product flow was observed. Conversion of glycerol was estimated as 88.3%. GC analysis of the lower layer indicated product formation as shown in Table 4, relative to elution of unconverted glycerol which appears in the C6-C9 window of n-alkanes elution. Formation of higher molecular weight condensation products is indicated by the formation of a water-immiscible oil phase, and GC products eluting in the C9-C12 n-alkanes window and higher.

TABLE 4

Product formation in lower aqueous layer relative to n-alkane retention times for feed of 50% glycerol/water at 400° C.

| Area % | C(n) |
|---|---|
| 40.6% | <C6 |
| 14.9% | C6-C9 |
| 35.8% | C9-C12 |
| 7.1% | C12-C15 |
| 1.6% | C15+ |

Example 21

Bagasse Hydrogenolysis with Dehydrogenation/Base Condensation

Sample of the final liquid from the direct nickel-catalyzed hydrogenolysis of bagasse in Example 15 was pulsed over 0.07 grams of Pd-hydrotalcite catalyst prepared as described in Example 18, for pulse microreactor experiments conducted under helium carrier gas at 375° C. GC results indicted virtually complete conversion of all polyols. Products formed exhibited retention times of corresponding n-alkanes as reported in Table 5.

TABLE 5

Retention times of products relative to n-alkanes for bagasse hyrogenolysis and condensation over Pd-hydrotalcite catalyst

| Area % | C(n) |
|---|---|
| 29.4% | <C6 |
| 39.4% | C6-C9 |
| 10.6% | C9-C12 |
| 19.9% | C12-C15 |
| 0.8% | C15+ |

The results show an ability to convert biomass to liquid biofuels (e.g., gasoline) by direct hydrogenolysis, followed by base condensation.

Therefore, the invention is well adapted to attain the ends and advantages mentioned as well as those that are inherent therein. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    contacting a bio-based feedstock comprising lignin with hydrogen and a hydrogenolysis catalyst in a reactor to produce a first reaction product comprising a stable hydroxyl intermediate,
    wherein at least a portion of the bio-based feedstock is converted to a carbohydrate in a hydrolysis reaction and the carbohydrate is converted to the first reaction product in a hydrogenolysis reaction, and
    wherein the hydrolysis reaction and the hydrogenolysis reaction are conducted in a single step;
    contacting at least a portion of the first reaction product comprising the stable hydroxyl intermediates with a dehydrogenation catalyst to form a second reaction product; and
    contacting at least a portion of the second reaction product with a condensation catalyst comprising a base functionality to form a fuel blend.

2. The method of claim 1 further comprising:
    contacting at least a portion of the first reaction product with a dehydration catalyst to produce a dehydrated reaction product.

3. The method of claim 1 wherein the carbohydrate is reacted directly with hydrogen in the presence of a hydrogenation catalyst prior to hydrogenolysis.

4. The method of claim 3 wherein the hydrogenolysis catalyst and the hydrogenation catalyst are the same catalyst.

5. The method of claim 1 wherein the dehydrogenation catalyst and the condensation catalyst are present in the same reactor.

6. The method of claim 2 wherein the hydrogenolysis catalyst and the dehydration catalyst are present in the same reactor vessel.

7. The method of claim 1 further comprising contacting at least a portion of the first reaction product with a catalyst comprising an acidic functionality to effect a ring opening reaction.

8. The method of claim 1 further comprising contacting at least a portion of the first reaction product with a catalyst comprising a base functionality to effect a ketonization reaction.

9. The method of claim 1 wherein the condensation catalyst further comprises an acidic functionality.

10. The method of claim 1 further comprising hydrotreating the fuel blend.

11. The method of claim 10 wherein the fuel blend comprises a diesel fuel or a jet fuel.

12. A method comprising:
    contacting a bio-based feedstock comprising lignin with hydrogen and a hydrogenolysis catalyst in a reactor to produce a first reaction product comprising a stable hydroxyl intermediate stream comprising higher polyols,
    wherein at least a portion of the bio-based feedstock is converted to a carbohydrate in a hydrolysis reaction and the carbohydrate is converted to the first reaction product in a hydrogenolysis reaction, and
    wherein the hydrolysis reaction and the hydrogenolysis reaction are conducted in a single step;
    separating at least a first portion of the higher polyols from the stable hydroxyl intermediate stream;
    recycling the first portion of the higher polyols to the reactor and reacting the higher polyols in a hydrogenolysis reaction to produce additional stable intermediates;
    contacting at least a portion of the stable hydroxyl intermediates with a dehydrogenation catalyst to form a second reaction product stream; and
    contacting at least a portion of the second reaction product stream with a condensation catalyst comprising a base functionality to form a fuel blend.

13. The method of claim 12 wherein the hydrolysis reaction is carried out in the presence of a hydrolysis catalyst.

14. The method of claim 13 wherein the hydrolysis catalyst comprises at least one catalyst selected from the group consisting of: an acid catalyst, a base catalyst, a metal catalyst, acetic acid, formic acid, levulinic acid, and any combination thereof.

15. The method of claim 12 wherein the carbohydrate is reacted directly with hydrogen in the presence of a hydrogenation catalyst prior to the hydrogenolysis reaction.

16. The method of claim 15 wherein the hydrogenation and hydrogenolysis catalysts are the same catalyst.

17. The method of claim 15 wherein the hydrogenolysis catalyst and the hydrogenation catalyst are present in the same reactor vessel.

18. The method of claim 12 wherein the dehydrogenation catalyst and the condensation catalyst are present in the same reactor vessel.

19. The method of claim 12 wherein the condensation catalyst further comprises an acid functionality.

20. The method of claim 12 further comprises hydrotreating the fuel blend.

21. The method of claim 20 wherein the fuel blend comprises at least one composition selected from the group consisting of: a diesel fuel, and a jet fuel.

22. The method of claim 12 further comprising contacting at least a portion of the first and second reaction products with a hydrogenation catalyst after the condensation catalyst to form the fuel blend.

23. The method of claim 1 wherein the bio-based feedstock comprising lignin comprises a solids feedstock.

24. The method of claim 12 wherein the bio-based feedstock comprising lignin comprises a solids feedstock.

25. The method of claim 1 wherein the first reaction product comprises polyols in an amount of greater than 25% by mole.

26. The method of claim 1 wherein the hydrolysis reaction comprises contacting at least a portion of the bio-based feedstock with an organic acid in said reactor.

27. The method of claim 12 wherein the stable hydroxyl intermediate stream comprises higher polyols in an amount of greater than 25% by mole.

\* \* \* \* \*